United States Patent
Grundvig et al.

(10) Patent No.: US 9,672,850 B2
(45) Date of Patent: Jun. 6, 2017

(54) SYSTEMS AND METHODS FOR SYNCHRONIZATION HAND SHAKING IN A STORAGE DEVICE

(71) Applicant: AVAGO TECHNOLOGIES GENERAL IP (SINGAPORE) PTE. LTD., Singapore (SG)

(72) Inventors: Jeffrey P. Grundvig, Loveland, CO (US); Richard Rauschmayer, Longmont, CO (US); Scott M. Dziak, Longmont, CO (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 60 days.

(21) Appl. No.: 14/217,783

(22) Filed: Mar. 18, 2014

(65) Prior Publication Data

US 2015/0243311 A1 Aug. 27, 2015

Related U.S. Application Data

(60) Provisional application No. 61/944,454, filed on Feb. 25, 2014, provisional application No. 61/946,698, filed on Feb. 28, 2014, provisional application No. 61/948,111, filed on Mar. 5, 2014.

(51) Int. Cl.
*G11B 5/596* (2006.01)
*G11B 20/10* (2006.01)
(Continued)

(52) U.S. Cl.
CPC ...... *G11B 5/4886* (2013.01); *G06F 17/30424* (2013.01); *G11B 5/09* (2013.01);
(Continued)

(58) Field of Classification Search
None
See application file for complete search history.

(56) References Cited

U.S. PATENT DOCUMENTS 5,523,990 A * 6/1996 Chiba ............... 369/47.22
5,729,408 A * 3/1998 Kikitsu ............. 360/294.7
(Continued)

OTHER PUBLICATIONS

U.S. Appl. No. 14/025,409, Unpublished (filing date Sep. 12, 2013) (Shaohua Yang).
U.S. Appl. No. 14/483,306, Unpublished (filing date Jan. 6, 2014) (Lu Pan).

*Primary Examiner* — Dismery Mercedes
(74) *Attorney, Agent, or Firm* — Sheridan Ross P.C.

(57) ABSTRACT

Systems, methods, devices, circuits for data processing, and more particularly to systems and methods for reporting a synchronization indication and for applying a synchronization window. As an example, a system is discussed that includes: a head assembly including a first read head and a second read head; a down track distance calculation circuit operable to calculate a down track distance between the first read head and the second read head; and a synchronization mark detection circuit. The synchronization mark detection circuit is operable to: assert a synchronization mark window based at a location based at least in part on the down track distance; query a first data set derived from the first read head for a synchronization mark occurring within the synchronization mark window; and query a second data set derived from the second read head for the synchronization mark occurring within the synchronization mark window.

19 Claims, 13 Drawing Sheets

(51) Int. Cl.
*G11B 5/48* (2006.01)
*G11B 5/39* (2006.01)
*G06F 17/30* (2006.01)
*G11B 5/09* (2006.01)

(52) U.S. Cl.
CPC .......... *G11B 5/3958* (2013.01); *G11B 5/3977* (2013.01); *G11B 5/59616* (2013.01); *G11B 5/59627* (2013.01); *G11B 5/59644* (2013.01); *G11B 5/3967* (2013.01); *G11B 5/4866* (2013.01); *G11B 20/10259* (2013.01)

(56) References Cited

U.S. PATENT DOCUMENTS

| | | | | |
|---|---|---|---|---|
| 5,780,828 | A * | 7/1998 | Mos et al. | 235/449 |
| 5,969,895 | A * | 10/1999 | Ueda et al. | 360/61 |
| 6,067,206 | A | 5/2000 | Hull | G11B 5/59688 360/77.02 |
| 6,157,510 | A * | 12/2000 | Schreck et al. | 360/77.06 |
| 7,859,782 | B1 * | 12/2010 | Lee | 360/51 |
| 7,948,706 | B2 * | 5/2011 | Bentley et al. | 360/76 |
| 8,514,506 | B1 * | 8/2013 | Li et al. | 360/39 |
| 8,737,011 | B1 * | 5/2014 | Buch et al. | 360/77.02 |
| 8,861,111 | B1 * | 10/2014 | Liao et al. | 360/39 |
| 8,902,536 | B1 * | 12/2014 | Hwang et al. | 360/75 |
| 2005/0078566 | A1 | 4/2005 | Wilson | G11B 5/5547 369/13.35 |
| 2010/0142078 | A1 * | 6/2010 | Annampedu et al. | 360/51 |
| 2011/0032636 | A1 | 2/2011 | Lee | G11B 5/012 360/76 |

* cited by examiner

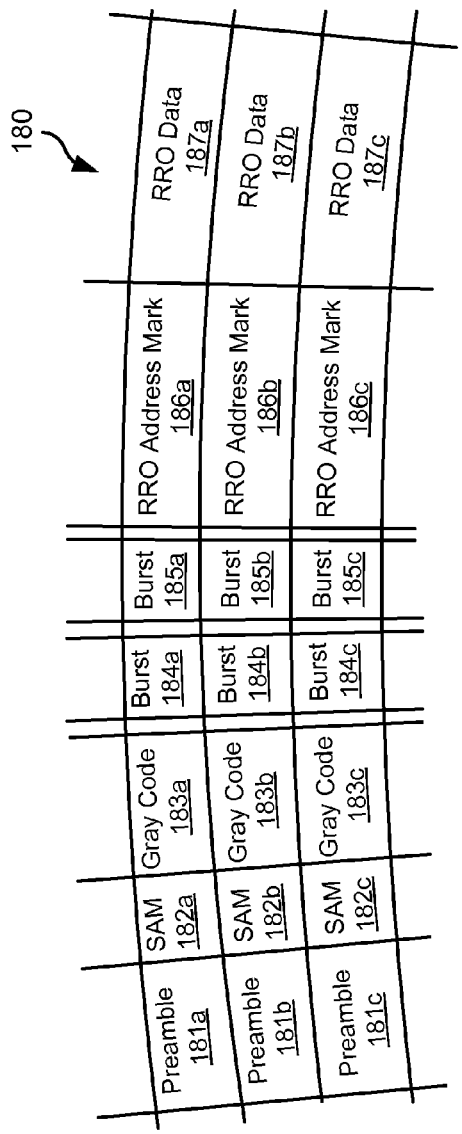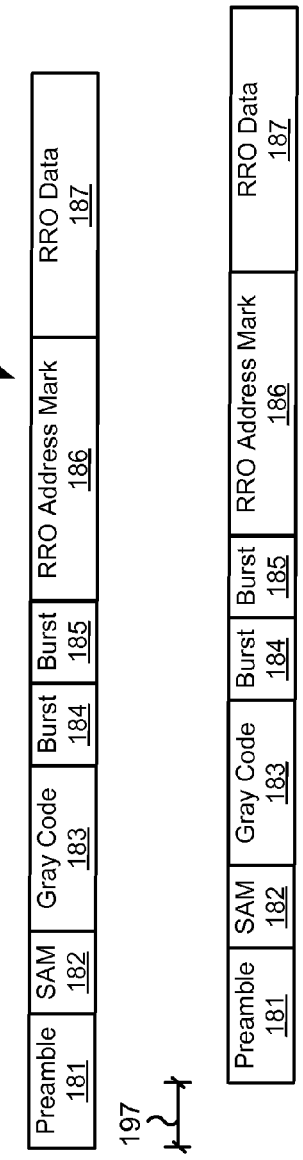

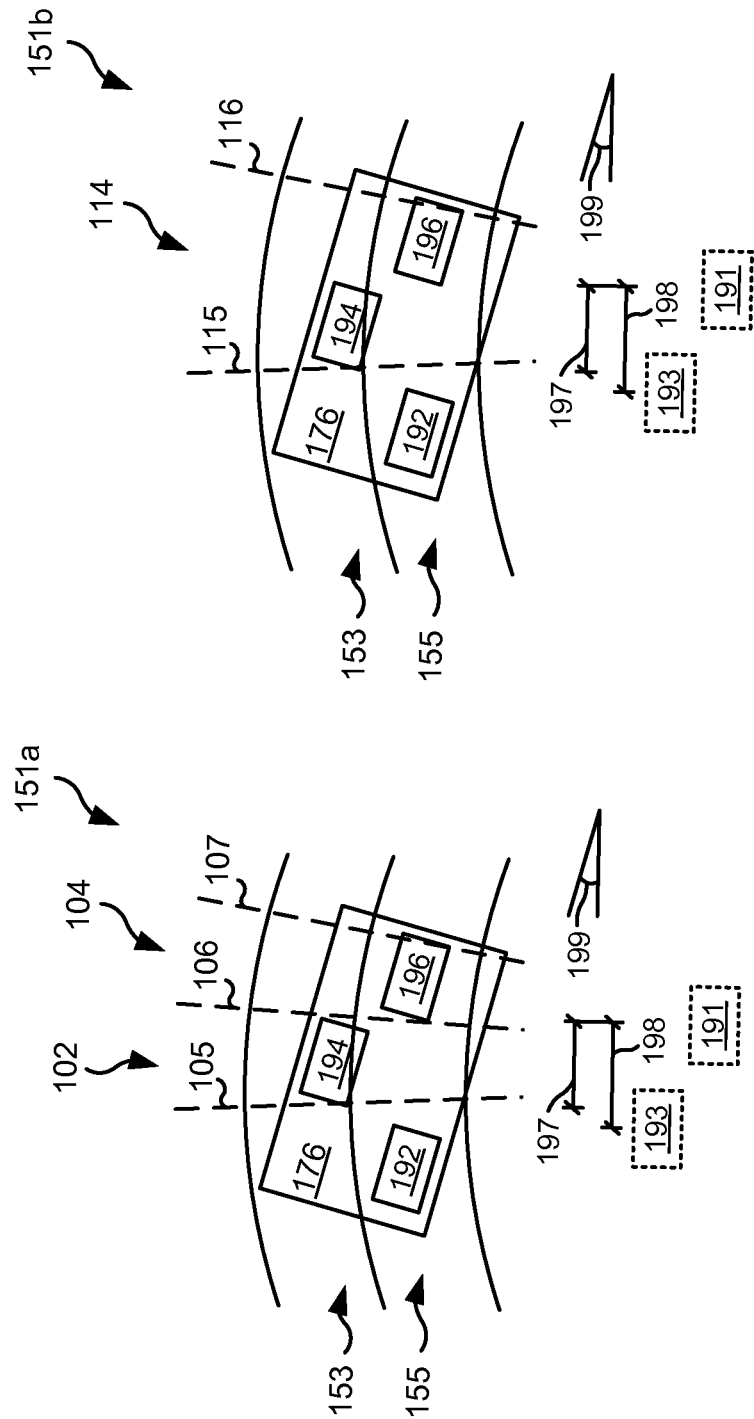

200
SYSTEMS AND METHODS FOR SYNCHRONIZATION HAND SHAKING IN A STORAGE DEVICE

CROSS REFERENCE TO RELATED APPLICATIONS

The present application claims priority to (is a non-provisional of) U.S. Pat. App. No. 61/944,454 entitled "Systems and Methods for Multi-Head Servo Data Processing", and filed Feb. 25, 2014 by Grundvig et al.; U.S. Pat. App. No. 61/946,698 entitled "Systems and Methods for Multi-Head Separation Determination", and filed Feb. 28, 2014 by Grundvig et al.; and U.S. Pat. App. No. 61/948,111 entitled "Systems and Methods for Synchronization Hand Shaking in a Storage Device", and filed Mar. 5, 2014 by Grundvig et al. The entirety of all of the aforementioned provisional patent applications is incorporated herein by reference for all purposes.

FIELD OF THE INVENTION

Systems, methods, devices, circuits for data processing, and more particularly to systems and methods for reporting a synchronization indication and for applying a synchronization window.

BACKGROUND

As the density of information stored on a storage medium increases, the use of multiple read heads has been developed to sense and process data from a user data region of a storage medium. In the case of two read heads, the two heads may be located, for example, approximately 100 nm apart in a down track direction. Straight forward data processing using such spacing leads to reasonable processing of user data regions, but results in some advantages and disadvantages in processing data from the servo data regions.

Hence, for at least the aforementioned reasons, there exists a need in the art for advanced systems and methods for processing data derived from servo data regions using multiple read heads.

SUMMARY

Systems, methods, devices, circuits for data processing, and more particularly to systems and methods for reporting a synchronization indication and for applying a synchronization window.

Various embodiments of the present invention provide systems for synchronizing to a data stream. The systems include a head assembly including a first read head and a second read head; a down track distance calculation circuit operable to calculate a down track distance between the first read head and the second read head; and a synchronization mark detection circuit. The synchronization mark detection circuit is operable to: assert a synchronization mark window based at a location based at least in part on the down track distance; query a first data set derived from the first read head for a synchronization mark occurring within the synchronization mark window; and query a second data set derived from the second read head for the synchronization mark occurring within the synchronization mark window.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1d shows an example of radial distribution of servo data on a storage medium;

FIG. 1e shows an example of relative timing of servo data derived from two different read heads in accordance with various embodiments of the present invention;

FIG. 1f shows the read/write assembly of FIG. 1c with close bit spacing representative of bit spacing near an interior diameter of a disk platter;

FIG. 1g shows the read/write assembly of FIG. 1c with far bit spacing representative of bit spacing near an outer diameter of a disk platter;

DETAILED DESCRIPTION OF SOME EMBODIMENTS

Figure 1A:
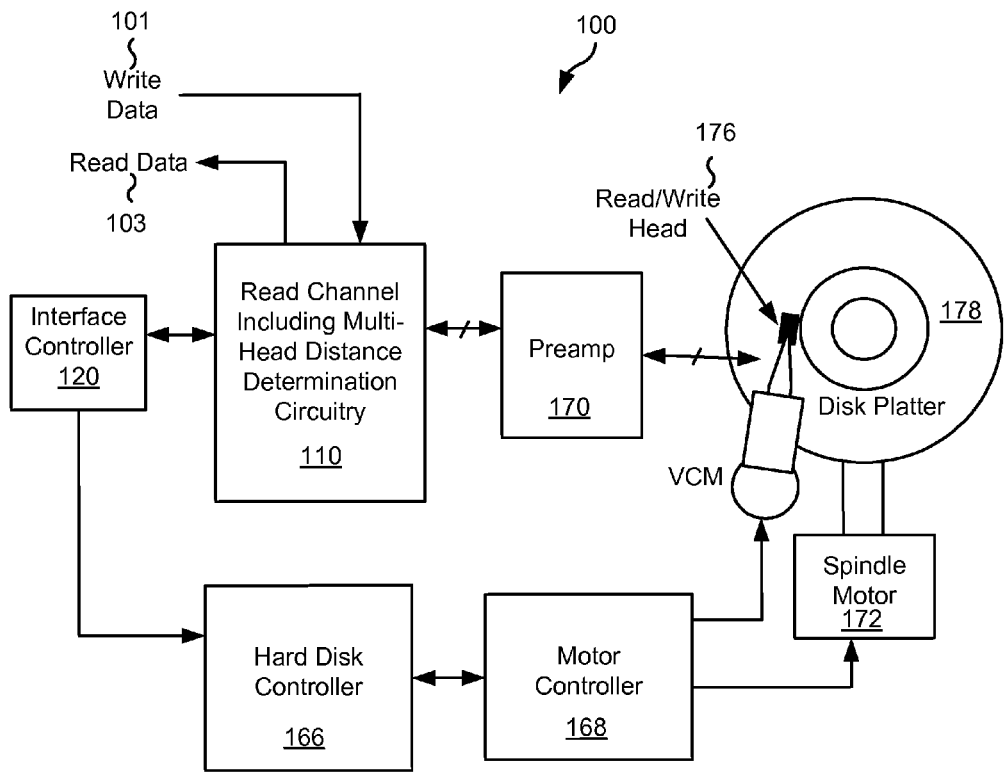
FIG. 1a shows a storage system including multi-head distance determination circuitry in accordance with some embodiments of the present invention.

Systems, methods, devices, circuits for data processing, and more particularly to systems and methods for determining a down track distance between two or more read heads on a read/write head assembly.

Various embodiments of the present invention provide systems for synchronizing to a data stream. The systems include a head assembly including a first read head and a second read head; a down track distance calculation circuit operable to calculate a down track distance between the first read head and the second read head; and a synchronization mark detection circuit. The synchronization mark detection circuit is operable to: assert a synchronization mark window based at a location based at least in part on the down track distance; query a first data set derived from the first read head for a synchronization mark occurring within the synchronization mark window; and query a second data set derived from the second read head for the synchronization mark occurring within the synchronization mark window. In some cases, the system is implemented as part of an integrated circuit.

In some instances of the aforementioned embodiments, the down track distance calculation circuit includes an integer distance calculation circuit operable to calculate an integer number of periods of a sample rate within a difference between a location of the synchronization mark in the first data set and a location of the synchronization mark in the second data set. In some cases, the down track distance calculation circuit further includes: a first phase detection circuit operable to determine a phase of the first data set; a second phase detection circuit operable to determine a phase of the second data set; and a fractional offset calculation circuit operable to calculate a fractional offset of the first read head from the second read head based at least in part on the phase of the first data set.

In one or more instances of the aforementioned embodiments, the system is implemented as part of a storage device, the storage device includes a storage medium, and the head assembly is disposed in relation to the storage device. In some cases, the down track direction changes based upon a location on the storage medium where the head assembly is disposed. In various instances of the aforementioned embodiments, the down track distance is calculated by a read channel circuit and provided to a controller circuit. The controller circuit includes a synchronization mark window location calculation circuit. The synchronization mark window location calculation circuit is operable to: calculate a location of the synchronization mark window based at least in part on the down track distance; and provide a synchronization mark window signal indicating the location of the synchronization mark window to the read channel circuit.

In one or more instances of the aforementioned embodiments, the down track distance is calculated by a read channel circuit. The system further includes a controller circuit that includes: a synchronization mark window location calculation circuit operable to: calculate a location of the synchronization mark window based at least in part on a maximum possible distance between the first read head and the second read head; and provide a synchronization mark window signal indicating the location of the synchronization mark window to the read channel circuit. In some cases, the read channel circuit further includes: a location modification circuit operable to modify the location of the synchronization mark window based upon the down track distance to yield an updated location. In such cases, the synchronization mark window is asserted based upon the updated location.

In various cases, the down track distance is calculated by a read channel circuit, the synchronization mark is identified in at least one of the first data set and the second data set, the synchronization mark detection circuit is operable to provide a synchronization mark indicator to a controller circuit, and the synchronization mark window is asserted before either of the first read head or the second read head is disposed over the location of a next synchronization mark on the storage medium. In some such instances, the controller circuit provides a synchronization mark window signal indicating the location of the synchronization mark window to the read channel circuit, and the synchronization mark window signal is asserted based upon the synchronization mark indicator. In other such instances, the synchronization mark indicator is the identified synchronization mark delayed by a period calculated based at least in part on the down track direction and to assure that the synchronization mark indicator is asserted at a location based upon a location of the identified synchronization mark.

Other embodiments of the present invention provide systems for processing a data stream that include: a head assembly including a first read head and a second read head; a first data path circuit operable to process data derived from the first read head; and a second data path circuit operable to process data derived from the second read head. Switching parameters used by the first data path is independent of switching parameters used by the second data path. In some instances, the system further includes a down track distance calculation circuit operable to calculate a down track distance between the first read head and the second read head. In such cases, the timing of switching parameters used by the first data path relative to switching parameters used by the second data path may correspond to the down track distance.

Turning to FIG. 1a, a storage system 100 including a read channel circuit 110 having multi-head distance determination circuitry in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

Figure 1B:
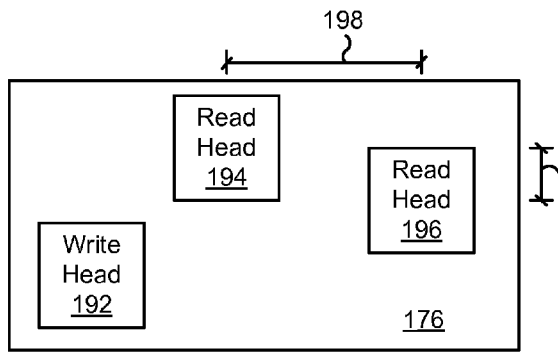
FIG. 1b shows the distribution of multiple read heads and a write head disposed as part of a read/write head assembly that may be used in relation to various embodiments of the present invention.
Figure 1C:
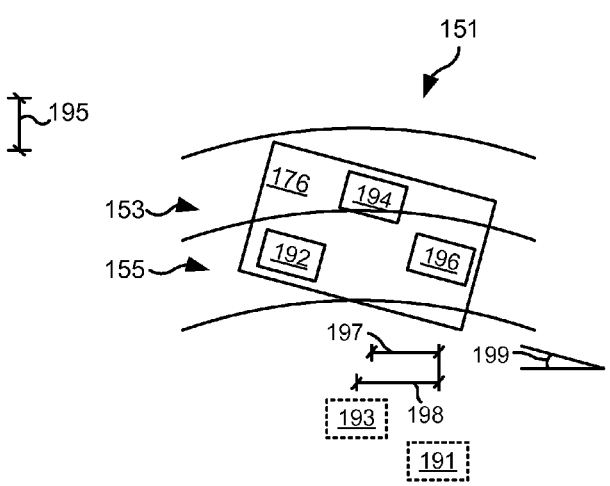
FIG. 1c shows the read/write head assembly disposed in relation to multiple tracks of a storage medium in accordance with some embodiments of the present invention.

In a typical read operation, read/write head assembly 176 is accurately positioned by motor controller 168 over multiple data tracks on disk platter 178. Read/write head assembly 176 includes two or more read heads capable of sensing data from two or more tracks at the same time, or for sensing multiple instances of the same track. An example of read/write assembly 176 is shown in FIG. 1b that includes two read heads 194, 196 that are physically separated in a down track direction by a distance 198, and in a cross track direction by a distance 195. Each of read heads 194, 196 are capable of sensing information from disk platter 178. In addition, read/write head assembly 176 includes a write head 192 that is capable of writing data to disk platter 178. FIG. 1c shows an example of read/write head assembly 176 disposed in relation to a section 151 of disk platter 178 that includes multiple tracks 153, 155 of disk platter 178. Read/write head assembly 176 exhibits a skew angle 199 relative to tracks 153, 155. As shown, the combination of the location of read/write head assembly 176, skew angle 199 and the cross-track separation of tracks 153, 155 results in read head 194 sensing data from track 153 and read head 196 sensing data track 196. Skew angle 199 results in a reduced distance 197 in the down track separation between read head 194 and read head 196. Reduced distance 197 is shown in relation to distance 198. Dashed boxes 193, 191 represent the relative location of read heads 194, 196 if skew angle 199 is zero. Distance 197 is related to distance 198 by the following equation:

Distance 197=(Distance 198)cos(skew angle 199).

In other cases, the combination of the location of read/write head assembly 176, skew angle 199 and the cross-track separation of tracks 153, 155 results in read head 194 sensing data from the same track. In an typical scenario, skew angle 199 may be assumed to be around fifteen degrees.

The sensing of different tracks by read head 194 and read head 196 is particularly useful where the servo data is radially distributed across multiple tracks. Turning to FIG. 1d, an example of a section 180 of disk platter 178 is shown where the portions of the servo data is radially distributed. As shown, the servo data includes a preamble 181 followed by a sector address mark (SAM) 182 in the down track direction, followed by a gray code 183 in the down track direction, followed by a first burst 184 in the down track direction, followed by a second burst in the down track direction, followed by a repeatable run out (RRO) address mark 186 in the down track direction, followed by the repeatable run out data 187 in the down track direction. Where read head 194 is sensing data from a different track than read head 196 both heads will be sensing the same portion of the servo data due to the radial distribution shown in FIG. 1d. FIG. 1e shows a timing diagram 188 of data received from read head 194 (i.e., the leading read head) and read head 196 (i.e., the lagging read head). As shown the timing difference between the leading read head and the lagging read head by distance 197 (i.e., the down track distance between read head 194 and read head 196).

Referring again to FIG. 1a, motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent to a desired track of disk platter 178 (e.g., track 155), magnetic signals representing data on the track are sensed by read/write head assembly 176 as disk platter 178 is rotated by spindle motor 172. The stream of sensed magnetic signals are provided as a continuous, minute analog signal representative of the magnetic data on the track of disk platter 178. This stream of minute analog signals is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signals to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

During a read of data from disk platter 178, data is received from read head 194 and read head 196. The data from each of read head 194 and read head 196 are used to process the received servo data. To assure the proper processing of the data received from the distinct read heads, the multi-head distance determination circuitry determines a down track separation of the read heads. An accurate determination of down track separation allows for accurate combination of the data sets from the different read heads. The distance determination processing of the data from read head 194 and read head 196 may be done using a system similar to one of those discussed below in relation to FIGS. 2-5, and/or may use a method similar to one of those discussed below in relation to FIGS. 5a-5b.

As set forth above, the down track distance between read heads 194, 196 as a function of skew angle 199. This skew angle may change as read/write head assembly 176 moves between the outer diameter and the inner diameter of disk platter 178. Further, the spacing between bit locations on read/write head assembly 176 changes from the inner diameter to the outer diameter of disk platter 178. Turning to FIG. 1f, an example section 151a of read/write head assembly 176 disposed near the inner diameter of disk platter 176 is shown. Bit locations 102, 104 are shown. Bit location 102 is located between a boundary 105 (shown as a dashed line) and a boundary 106 (shown as a dashed line), and bit location 104 is located between boundary 106 and a boundary 107 (shown as a dashed line). Turning to FIG. 1g, an example section 151b of read/write head assembly 176 disposed near the outer diameter of disk platter 176 is shown. A bit location 114 is shown that is located between a boundary 115 (shown as a dashed line) and a boundary 116 (shown as a dashed line). Comparing example section 151a and example section 151b shows that nearer an inner diameter of disk platter 178 read heads 194, 196 may be disposed over different bit locations, but near the outer diameter of disk platter 178 having read heads 194, 196 disposed over different bit locations is less likely. It is important to understand the physical distance between read head 194 and read head 196 to assure proper alignment of data derived from the two different read heads.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

In a servo system accurately detecting the servo address mark (SAM) is a critical function as it is used to locate and process the other servo fields and also for placing the subsequent user data events. Therefore, having a low SAM miss rate as well as low SAM false rate is important. Furthermore having a low error rate for detecting the Gray code and RRO fields of the servo information is also important. The SAM and Gray servo fields are particularly adept to potential benefits from a multiple heads since unlike user data or RRO, these fields are continuous across the stroke where both heads should be reading the same information regardless of their cross track separation with the possible exception of a limited number of bits that may change from track to track.

Figure 2:
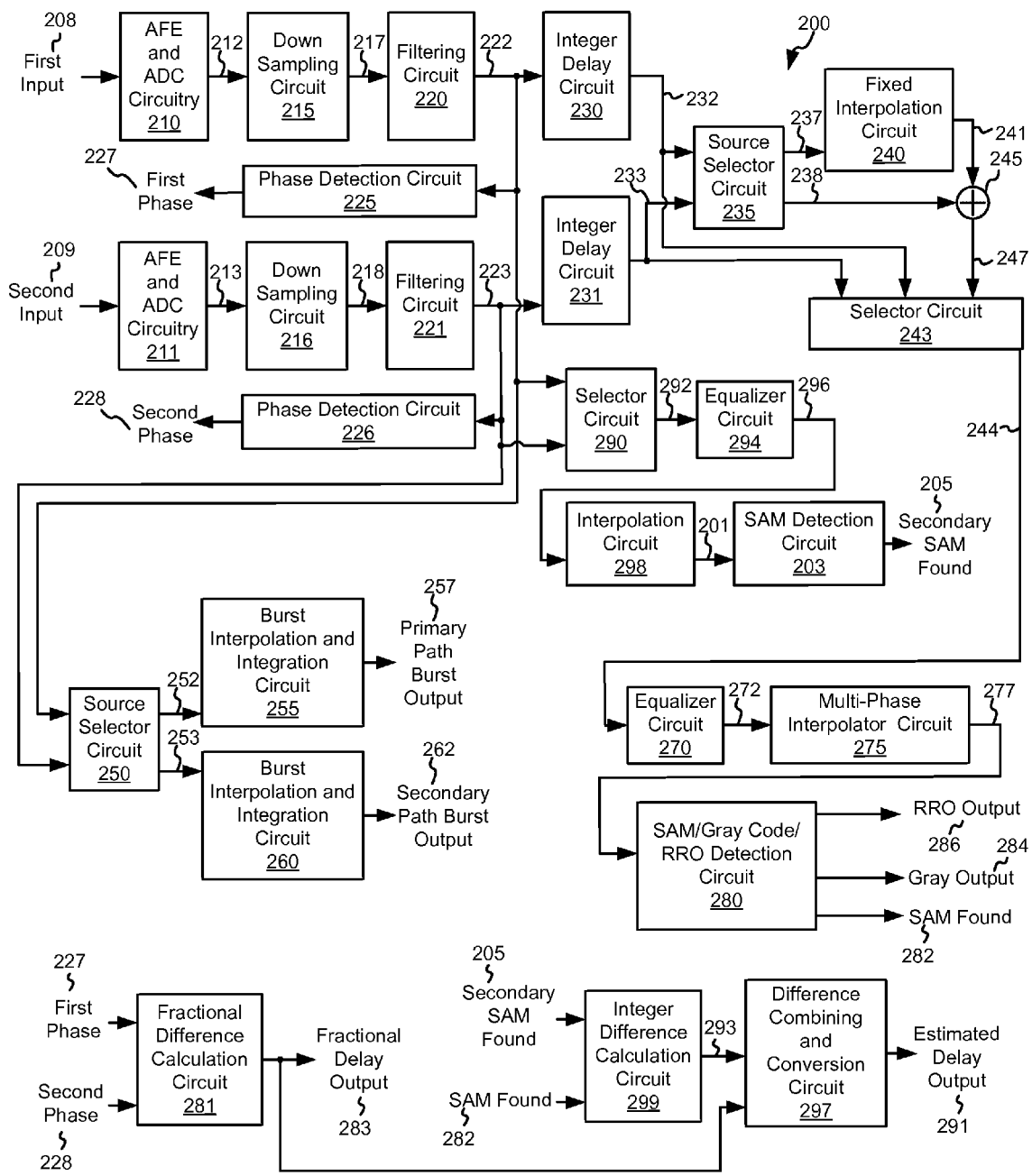
FIG. 2 depicts a system for processing servo data derived from two heads including distance calculation based at least in part on sector address mark detection provided from two SAM detection circuits in accordance with some embodiments of the present invention.

One method to improve the overall signal quality is to average the sensed information derived from different read heads. Such averaging tends to reduce the impact of noise occurring in one of the sensed signals (i.e., uncorrelated noise). This averaging is applied to the processing of the SAM/Gray Code/RRO fields, but is not applied to processing the burst data. Such averaging would not enhance the processing of the burst data, but would rather reduce the information available from the burst fields. Turning to FIG. 2, a system 200 for processing servo data derived from two heads including a single multi-phase interpolator circuit is shown in accordance with some embodiments of the present invention.

As shown, system 200 includes analog front end and analog to digital conversion circuitry 210 that receives a first input 208 (i.e., an input from a first read head) and provides corresponding digital samples 212. The analog front end circuitry processes first input 208 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 212 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 212 are provided to a down sampling circuit 215.

Down sampling circuit 215 down samples digital samples 212 to yield a down sampled output 217. In some embodiments of the present invention, the down sampling is a 2× down sampling. Down sampling circuit 215 may implement any approach known in the art for down sampling an input data set. Down sampled output 217 is provided to a filtering circuit 220 that applies a low pass digital filtering algorithm to the input to yield a sampled output 222. In some embodiments of the present invention, the down sampling and the low pass digital filtering algorithm are applied by the same circuit (i.e., a combination of down sampling circuit 215 and filtering circuit 220).

Filtered output 222 is provided to both an integer delay circuit 230 and a phase detection circuit 225. Phase detection circuit 225 detects a phase of filtered output 222, and provides the detected phase as a first phase 227. Phase detection circuit 225 may be any circuit known in the art that is capable of identifying the phase of a digital signal. Based upon the disclosure provided herein, one of ordinary skill in the art will recognize a variety of phase detection circuits that may be used in relation to different embodiments of the present invention. Integer delay circuit 230 delays filtered output 222 by a first delay to yield a first delayed output 232.

Similarly, system 200 includes analog front end and analog to digital conversion circuitry 211 that receives a second input 209 (i.e., an input from a second read head) and provides corresponding digital samples 213. The analog front end circuitry processes second input 209 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 213 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 213 are provided to a down sampling circuit 214.

Down sampling circuit 214 down samples digital samples 213 to yield a down sampled output 219. In some embodiments of the present invention, the down sampling is a 2× down sampling. Down sampling circuit 214 may implement any approach known in the art for down sampling an input data set. Down sampled output 219 is provided to a filtering circuit 221 that applies a low pass digital filtering algorithm to the input to yield a sampled output 223. In some embodiments of the present invention, the down sampling and the low pass digital filtering algorithm are applied by the same circuit (i.e., a combination of down sampling circuit 214 and filtering circuit 221).

Filtered output 223 is provided to both an integer delay circuit 231 and a phase detection circuit 226. Phase detection circuit 226 detects a phase of filtered output 223, and provides the detected phase as a first phase 228. Phase detection circuit 223 may be any circuit known in the art that is capable of identifying the phase of a digital signal. Based upon the disclosure provided herein, one of ordinary skill in the art will recognize a variety of phase detection circuits that may be used in relation to different embodiments of the present invention. Integer delay circuit 231 delays filtered output 223 by a second delay to yield a second delayed output 233.

The first delay and the second delay are chosen such that first delayed output 232 and second delayed output 233 are aligned within one sampling period. Selection of the first delay and the second delay are based at least in part on the down track distance between a read head providing first input 208 and a read head providing second input 209. In some cases, integer delay circuit 231 may be eliminated and all adjustment to align first delayed output 232 with second delayed output 233 being done by integer delay circuit 230. Such an approach assumes that first input 208 is guaranteed to come from a leading read head (e.g., read head 194) and second input 209 is guaranteed to come from a lagging read head (e.g., read head 196).

The amount of delay applied by the combination of delay circuit 230 and delay circuit 231 corresponds to an integer delay output 293. A difference calculation circuit 299 calculates a difference 293 between secondary SAM found 205 and SAM found 282 to yield integer delay output 293. Secondary SAM output 205 indicates a location of a sector address mark identified in a data stream derived from one of first input 208 or second input 209, and SAM found 282 indicates a location of a sector address mark identified in a data stream derived from the other of first input 208 or second input 209. Integer delay output 293 is provided to a difference combining and conversion circuit 297 where it is added to a fractional delay output 283 (in some cases as discussed below in relation to FIG. 4 where one implementation of difference combining and conversion circuit 297) to yield a sum, and the sum is divided by the period of the read clock used to generate first input 208 or second input 209 to yield an integer number of clocks of the read data (i.e., the integer portion of the division) that is provided as an estimated delay output 291. Integer delay output 293 is used to control the alignment delay implemented by the combination of integer delay circuit 230 and integer delay circuit 231.

A source selector circuit 235 selects one of first delayed output 232 or first delayed output 233 as having a leading phase relative to the phase of the other. Determination of the relative phase status of first delayed output 232 and second phase output 233 is determined by comparing first phase 227 with second phase 228. Source selector circuit 235 provides the one of first delayed output 232 or second delayed output 233 with the leading fractional phase (i.e., a fractional difference in phase) as a leading phase output 237, and provides the other of first delayed output 232 or second delayed output 233 as a lagging phase output 238. Leading phase output 237 is provided to a fixed interpolation circuit 240 that interpolates the input by a phase shift amount to yield an aligned output 241. The phase shift amount is a fraction of a read clock period and is calculated as the magnitude of the difference between first phase 227 and second phase 228 by a fractional difference calculation circuit 281. Fractional difference calculation circuit 281 provides the difference between first phase 227 and second phase 228 as fractional delay output 283. Fractional delay output 283 is provided to fixed interpolation circuit 240 that interpolates leading phase output 237 by the fractional amount to align it with lagging phase output 238. Fixed interpolation circuit 240 may be any circuit known in the art that is capable of interpolating an input to yield a phase modified output.

Aligned output 241 is added to lagging phase output 238 by a summation circuit 245 to yield an aggregated output 247. Such summation effectively averages first input 208 with second input 209 and thereby reduces the effect of any uncorrelated noise evident on one or the other of lagging phase output 238 and aligned output 241. Aggregated output 247 is provided to a selector circuit 243 along with first delayed output 232 and second delayed output 233. During a standard operation, selector circuit 243 provides aggregated output 247 as a selected output 244. Selected output 244 is provided to an equalizer circuit 270 that applies an equalization algorithm to the input to yield an equalized output 272. In some embodiments of the present invention, equalizer circuit 270 is a digital finite impulse response circuit as is known in the art.

Equalized output 272 is provided to a multi-phase interpolator circuit 275 to yield a peak output 277. In one particular embodiment of the present invention, multi-phase interpolator circuit 275 is an eight phase interpolator circuit that compares eight phases for each sampling period of the analog to digital conversion circuitry and determines which of the phases yields a peak amplitude of the preamble data. The phase yielding the peak amplitude of the preamble data is provided as peak output 277. Peak output 277 is processed by a processing circuit 280. Processing circuit 280 queries peak output 277 to yield a SAM Found signal 282 corresponding to the location of a sector address mark in peak output 277, processes peak output 277 to yield a Gray output 284, and processes peak output 277 to yield an output 286. Processing to yield SAM found signal 282, Gray output 284, and repeat run out (RRO) output 286 may be done using any processing circuit known in the art that is capable of processing respective portions of servo data corresponding to a sector address mark, gray code, and repeat run out data.

Additionally, system 200 includes secondary sector address mark detection circuitry that includes a selector circuit 290, an equalizer circuit 294, and interpolation circuit 298, and a SAM detection circuit 203. Selector circuit 290 selects one of sampled output 222 or sampled output 223 as a secondary SAM output 292. The selection applied by selector circuit 290 may be made consistent with the selection applied by source selector circuit 235. In particular, where source selector circuit 235 selects first delayed output 232 corresponding to first input 208 as leading phase output 237, selector circuit 290 selects sampled output 222 corresponding to first input 208 as secondary SAM output 292. Alternatively, where source selector circuit 235 selects second delayed output 233 corresponding to second input 209 as leading phase output 238, selector circuit 290 selects sampled output 223 corresponding to second input 209 as secondary SAM output 292. In other embodiments, one of sampled output 222 or sampled output 223 may be selected as secondary SAM output 292 based upon another selection criteria.

An equalizer circuit 294 applies an equalization algorithm to secondary SAM output 292 to yield an equalized output 296. In some embodiments, equalizer circuit 294 is a digital finite impulse response circuit as is known in the art. Equalized output 296 is provided to an interpolator circuit 298 that is operable to interpolate equalizer output 296 to yield an interpolated output 201. The interpolation operates to interpolate equalized input 296 to correspond to the peaks of the preamble of the received data samples. Interpolator circuit 298 may be implemented using a multi-phase interpolator circuit similar to multi-phase interpolator circuit 275. Based upon the disclosure provided herein, one of ordinary skill in the art will recognize a variety of interpolation algorithms that may be used in relation to different embodiments of the present invention. Interpolated output 201 is provided to a SAM detection circuit 203. SAM detection circuit 203 applies a sector address mark detection to interpolated output 201 to yield a secondary SAM found output 205. SAM detection circuit 203 may be any circuit known in the art that is capable of detecting a sector address mark in a servo data stream.

During an initialization phase, selector circuit 243 selects one of first delayed output 232 and second delayed output 233 as selected output 244. By doing so, SAM found 282 corresponds to the location of the sector address mark in the selected one of first delayed output corresponding to first input 208 or second delayed output 233 corresponding to second input 209. Selector circuit 290 selects the other of sampled output 222 corresponding to first input 208 or sampled output 223 corresponding to second input 209. By making such selections, SAM found 282 indicates the location of a sector address mark in the selected one of first input 208 or second input 209, and secondary SAM found 205 indicates the location of a sector address mark in the other of first input 208 or second input 209. By doing this, difference calculation circuit 299 receives an indication of the location of a sector address mark as found in the data inputs derived from the two different read heads. As such, the difference in the locations indicated by an integer delay output 293 and corresponds to a down track distance between the read heads from which first input 208 and second input 209 are derived.

System 200 additionally includes a source selector circuit 250 that selects one of sampled output 222 or sampled output 223 as a leading output 252, and the other of sampled output 222 or sampled output 223 as a lagging output 253. The selection applied by source selector circuit 250 corresponds to the selection made by source selector circuit 235. In particular, where source selector circuit 235 selects first delayed output 232 corresponding to first input 208 as leading phase output 237, source selector circuit 250 selects sampled output 222 corresponding to first input 208 as leading output 252. Alternatively, where source selector circuit 235 selects second delayed output 233 corresponding to second input 209 as leading phase output 238, source selector circuit 250 selects sampled output 223 corresponding to second input 209 as leading output 253.

A burst interpolation and integration circuit 255 applies burst interpolation and integration processing to generate a primary path burst output 257. The burst processing may be performed using any circuit known in the art for processing burst information from servo data. Another burst interpolation and integration circuit 260 applies the same synchronization and burst processing applied by burst interpolation and integration circuit 255 to generate a secondary path burst output 262. Again, the burst processing may be performed using any circuit known in the art for processing burst information from servo data. As the burst data is used to indicate an offset from a centerline of a track, averaging data sets derived from different offsets from the centerline effectively undermines the burst data. For this reason, the burst processing is performed on independent data sets derived from respective ones of first input 208 and second input 209, and results in independent burst outputs. Primary path burst output 257 and secondary path burst output 262 are provided to a host (not shown) that uses the information to adjust the location of a read/write head assembly (not shown) relative to sensed tracks (not shown). It should be noted that while the embodiment shows data path independent burst processing that other embodiments of the present invention may provide for the two burst integration/interpolation phases to be set using an averaged phase from the two heads along with the head offset estimate to set them differently but dependent on both the averaged phase and the offset estimate.

In some embodiments of the present invention, a combination of estimated delay output 283 (a fractional offset) and integer delay output 293 (an integer offset) are updated during all phases of operation. In other embodiments of the present invention, both integer delay output 293 and estimated delay output 283 are updated during a start up period. In contrast, integer delay output 293 remains fixed during steady state tracking (i.e., tracking within a limited rage of tracks on a storage medium), and only estimated delay output 283 is updated during such steady state tracking. This approach recognizes that the integer offset will change very little during steady state tracking. Where, on the other hand, significant changes are expected, such as, for example, during start up where the location on the storage medium is not yet determined, both estimated delay output 283 and integer delay output 293 are capable of significant changes. By updating only estimated delay output 283 (the fractional offset), the possibility of a large error being introduced due to a missed SAM (i.e., an error in either secondary SAM found 205 and SAM found 282) is reduced as integer delay output 293 is not changeable.

Figure 3:
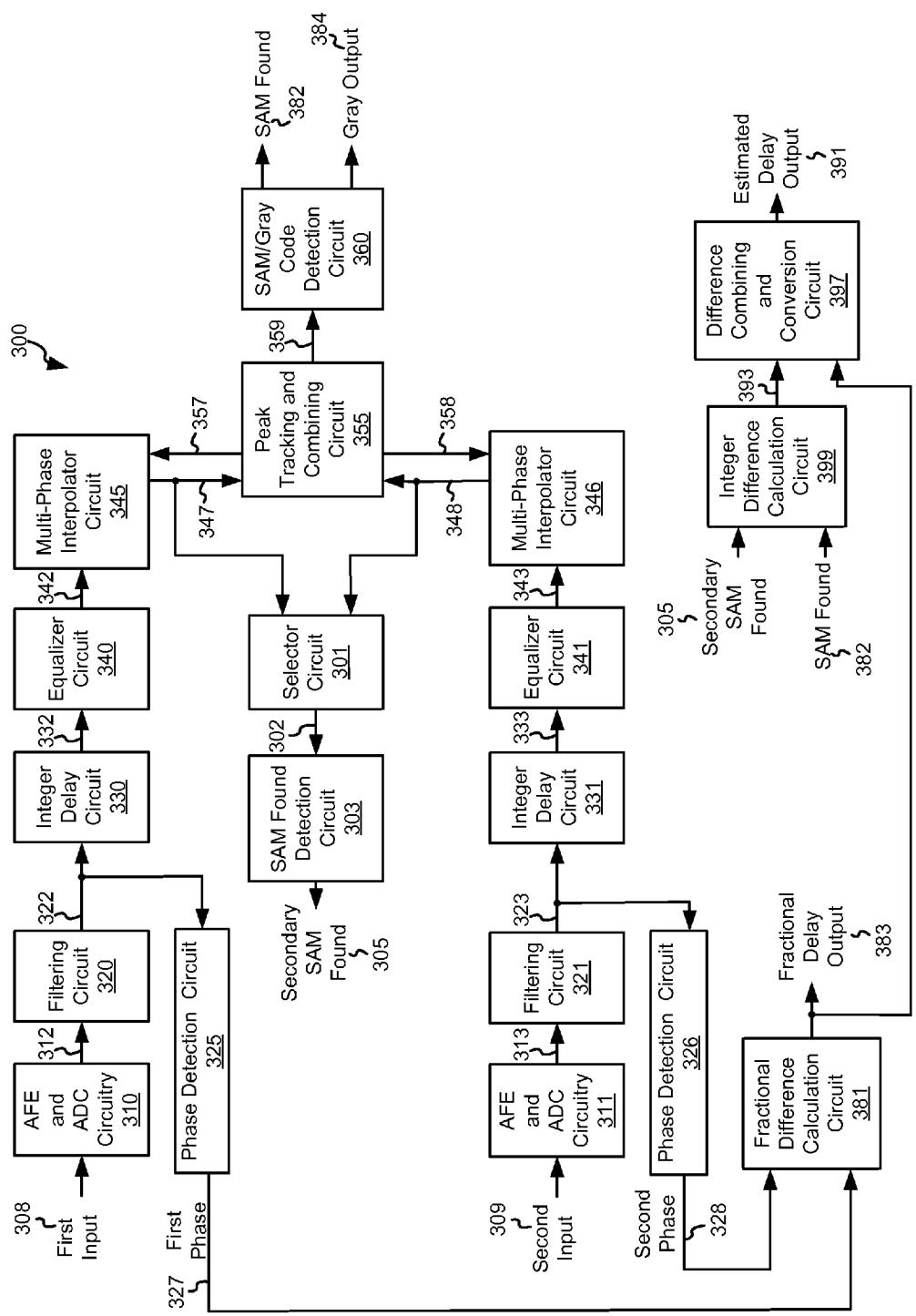
FIG. 3 shows another system for processing servo data derived from two heads including individual multi-phase interpolator circuits associated with respective ones of the two heads and distance calculation circuitry operable to calculate distance based at least in part on sector address mark detection provided from two SAM detection circuits in accordance with other embodiments of the present invention.

Turning to FIG. 3, another system 300 is shown for processing servo data derived from two heads including individual multi-phase interpolator circuits associated with respective ones of the two heads and distance calculation circuitry operable to calculate distance based at least in part on sector address mark detection provided from two SAM detection circuits in accordance with other embodiments of the present invention. As shown, system 300 includes analog front end and analog to digital conversion circuitry 310 that receives a first input 308 (i.e., an input from a first read head) and provides corresponding digital samples 312. The analog front end circuitry processes first input 308 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 312 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 312 are provided to a filtering circuit 320 that applies a digital low pass filtering algorithm to the input to yield a filtered output 322.

Filtered output 322 is provided to both an integer delay circuit 330 and a phase detection circuit 325. Phase detection circuit 325 detects a phase of filtered output 322, and provides the detected phase as a first phase 327. Phase detection circuit 325 may be any circuit known in the art that is capable of identifying the phase of a digital signal. Based upon the disclosure provided herein, one of ordinary skill in the art will recognize a variety of phase detection circuits that may be used in relation to different embodiments of the present invention. Integer delay circuit 330 delays filtered output 322 by a first delay to yield a first delayed output 332.

First delayed output 332 is provided to an equalizer circuit 340 that applies an equalization algorithm to the input to yield an equalized output 342. In some embodiments of the present invention, equalizer circuit 340 is a digital finite impulse response circuit as is known in the art. Equalized output 342 is provided to a multi-phase interpolator circuit 345 that interpolates the input to yield interpolated phases as a phase output 347. In one particular embodiment of the present invention, multi-phase interpolator circuit 345 is an eight phase interpolator circuit that yields eight values for each phase of a received signal, and provides the phases as a phase output 347 to a peak tracking and combining circuit 355.

Similarly, system 300 includes analog front end and analog to digital conversion circuitry 311 that receives a second input 309 (i.e., an input from a second read head) and provides corresponding digital samples 313. The analog front end circuitry processes second input 309 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 313 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 313 are provided to a filtering circuit 321 that applies a digital low pass filtering algorithm to the input to yield a filtered output 323.

Filtered output 323 is provided to both an integer delay circuit 331 and a phase detection circuit 326. Phase detection circuit 326 detects a phase of filtered output 323, and provides the detected phase as a second phase 328. Phase detection circuit 326 may be any circuit known in the art that is capable of identifying the phase of a digital signal. Based upon the disclosure provided herein, one of ordinary skill in the art will recognize a variety of phase detection circuits that may be used in relation to different embodiments of the present invention. Integer delay circuit 331 delays filtered output 323 by a second delay to yield a second delayed output 333.

Second delayed output 333 is provided to an equalizer circuit 341 that applies an equalization algorithm to the input to yield an equalized output 343. In some embodiments of the present invention, equalizer circuit 341 is a digital finite impulse response circuit as is known in the art. Equalized output 343 is provided to a multi-phase interpolator circuit 346 that interpolates the input to yield interpolated phases as a phase output 348. In one particular embodiment of the present invention, multi-phase interpolator circuit 346 is an eight phase interpolator circuit that yields eight values for each phase of a received signal, and provides the phases as a phase output 348 to peak tracking and combining circuit 355.

A selector circuit 301 selects one of phase output 347 or phase output 348 as a sector address mark input 302. Sector address mark input 302 is provided to a secondary sector address mark detection circuit 303. Secondary sector address mark detection circuit 303 applies a sector address mark detection to sector address mark input 302 to yield a secondary SAM found output 305. As such, SAM found output 305 indicates the location of a sector address mark within a selected one of first input 308 or second input 309. During an initialization process, a peak tracking and combining circuit 355 selects the opposite one of phase output 347 or phase output 348 than that selected by selector circuit 301. As such, during the initialization process, a SAM found 382 corresponds to the opposite one of phase output 347 or phase output 348 corresponding to a respective one of first input 308 or second input 309. Thus, during the initialization period, SAM found 382 corresponds the location of a sector address mark in one of first input 308 or second input 309, and secondary SAM found 305 corresponds the location of a sector address mark in the other of first input 308 or second input 309. Secondary sector address mark detection circuit 303 may be any circuit known in the art that is capable of detecting a sector address mark in a servo data stream.

Head offset estimating circuitry is included in system 300 and is used to provide an estimation of the down track distance between read heads from which first input 308 and second input 309. The head offset estimating circuitry includes both integer offset calculation and fractional offset calculation. The integer offset calculation is accomplished by a difference calculation circuit 399. Difference calculation circuit 399 calculates a difference 393 between secondary SAM found 305 and SAM found 382. Secondary SAM output 305 indicates a location of a sector address mark identified in a data stream derived from one of first input 308 or second input 309, and SAM found 382 indicates a location of a sector address mark identified in a data stream derived from the other of first input 308 or second input 309. Integer delay output 393 is provided to a difference combining and conversion circuit 397 where it is added to a fractional delay output 383 (in some cases as discussed below in relation to FIG. 4 where one implementation of difference combining and conversion circuit 397) to yield a sum, and the sum is divided by the period of the read clock used to generate first input 308 or second input 309 to yield an integer number of clocks of the read data (i.e., the integer portion of the division) that is provided as an estimated delay output 391. Integer delay output 393 is used to control the alignment delay implemented by the combination of integer delay circuit 330 and integer delay circuit 331.

The fractional offset calculation is accomplished by a fractional difference calculation circuit 381. Fractional difference calculation circuit 381 provides the difference between first phase 327 and second phase 328 as a fractional delay output 383. Fractional delay output 383 is provided to peak tracking and combining circuit 355 that operates to select the phase exhibiting a peak. The aforementioned fractional delay output 383 may be made using any approach known in the art. For example, in one embodiment of the present invention, fractional delay output 383 is calculated by subtracting first phase 326 from second phase 328 (the integer distance between the two signal sets was already compensated by the difference between the first delay used by integer delay circuit 330 and the second delay used by integer delay circuit 331). Peak tracking and combining circuit 355 selects the best phase from each of phase output 347 and phase output 348 and provides a best phase indicator 357, 358 to respective multi-phase interpolator circuits 345, 346. In addition, peak tracking and combining circuit 355 interpolates either of the best phase from phase output 347 or the best phase from phase output 348 to account for offset distance 352, and thus aligning the selected phase from phase output 347 with the selected phase from phase output 348. During an non-initiation mode, peak tracking and combining circuit 355 sums the aligned instances of phase output 347 and phase output 348 to yield an aligned sum output 359.

Aligned sum output 359 is provided to a processing circuit 360. Processing circuit 360 queries aligned sum output 359 to yield a SAM Found signal 382 corresponding to the location of a sector address mark in aligned sum output 359, and aligned sum output 359 to yield a Gray output 384. Processing to yield SAM found signal 382 and Gray output 384 may be done using any processing circuit known in the art that is capable of processing respective portions of servo data corresponding to a sector address mark and the gray code.

In some embodiments of the present invention, a combination of estimated delay output 383 (a fractional offset) and integer delay output 393 (an integer offset) are updated during all phases of operation. In other embodiments of the present invention, both integer delay output 393 and estimated delay output 383 are updated during a start up period. In contrast, integer delay output 393 remains fixed during steady state tracking (i.e., tracking within a limited rage of tracks on a storage medium), and only estimated delay output 383 is updated during such steady state tracking. This approach recognizes that the integer offset will change very little during steady state tracking. Where, on the other hand, significant changes are expected, such as, for example, during start up where the location on the storage medium is not yet determined, both estimated delay output 383 and integer delay output 393 are capable of significant changes. By updating only estimated delay output 383 (the fractional offset), the possibility of a large error being introduced due to a missed SAM (i.e., an error in either secondary SAM found 305 and SAM found 382) is reduced as integer delay output 393 is not changeable.

The aforementioned architecture provides peak tracking (i.e., phase tracking) on the combined peak values. To do this, two instances of the multi-phase interpolator circuit are used (i.e., one for each path). The peak tracking decisions are performed based on a combined average of the two signal streams. Since the two peak tracking interpolation filters are both rotating the phase of their respective signal paths to sample on the peaks of the wide-biphase encoded symbols they will naturally output the same phase as is needed to sum the two signal streams together.

It should be noted that in any of the embodiments discussed above in relation to FIGS. 2-3, the ability to perform averaging on some servo fields but not others may be included in the circuitry. For example, a user may wish to average or combine the two signals for Gray code detection but not for repeat run out. Since repeat run out is not a continuous field across the stroke like the sector address mark and GRAY code it may be that on some tracks the averaging will help for repeat run out, but not for others. For example near the outer diameter of a disk platter or an inner diameter of the disk platter where the two heads are likely to have the maximum cross track separation it could be that one of the heads will not come in contact with the repeat run out field and therefore it would only contribute noise to the detection.

During spiral self servo write the concentric position or timing of when to write as well as the radial head position is controlled by reading and processing spiral waveforms in order to correctly position and time the write events in order to write the final concentric servo tracks across the disk surface in the correct locations. There are two fundamental measurements which the channel makes over the spiral waveform which it in turn provides to the controller to facilitate the servo self write process. The first fundamental measurement is the position and phase of the multiple SAM patterns which appear during a spiral event. The second fundamental measurement is the position or location of where the spiral waveform reaches its peak amplitude. In particular, the channel provides burst amplitude information for several burst integration windows which span across the spiral event. An example of spiral measurement is set forth in U.S. Pat. No. 8,498,072 entitled "Systems and methods for spiral waveform detection" and filed on Nov. 29, 2010. The entirety of the aforementioned reference is incorporated herein by reference for all purposes.

When two or more read heads are measuring the spiral signal there is an opportunity to improve the quality of both of these measurements for spiral events. For example since the two read heads will typically be located at slightly different radial positions they will intersect the spiral track at slight different positions and will therefore produce signals which will have largely uncorrelated noise. Therefore the firmware can read the burst measurements from both heads and use this to arrive at a better peak estimate than would be possible with just one read head.

Figure 4:
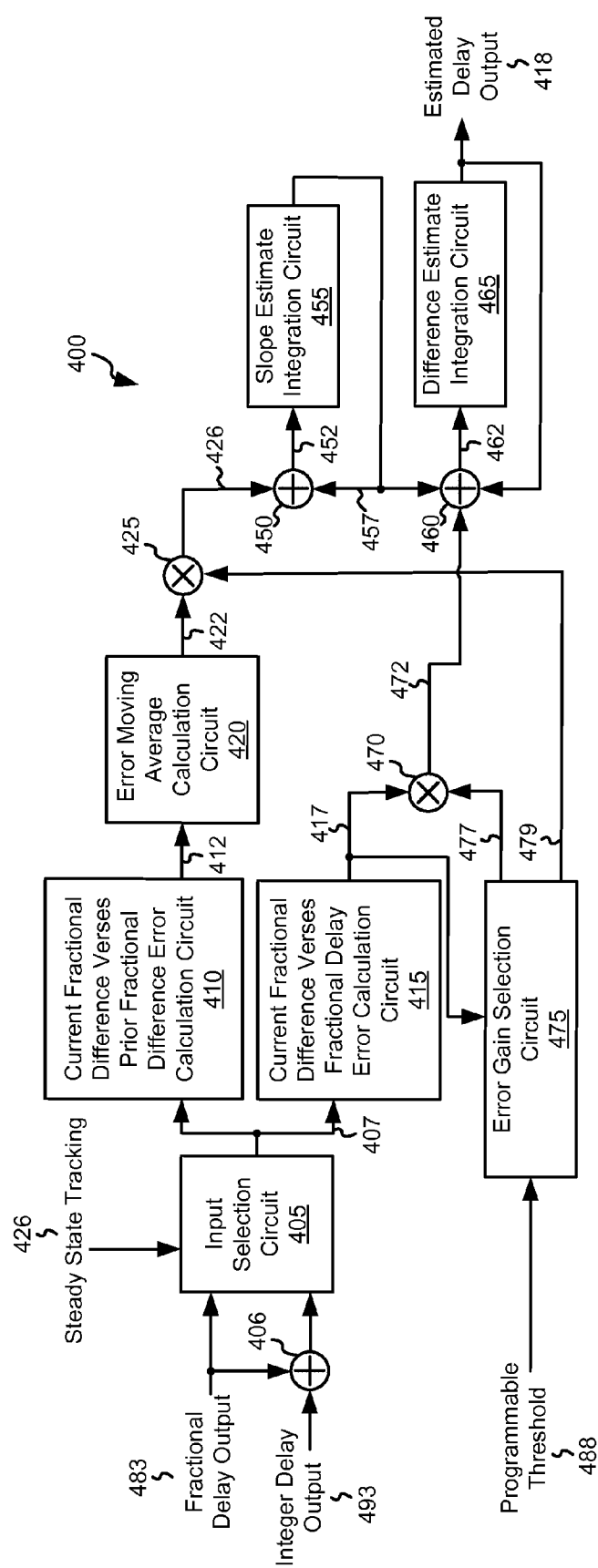
FIG. 4 shows a head distance tracking circuit in accordance with various embodiments of the present invention.

Turning to FIG. 4, a head distance tracking circuit 400 in accordance with various embodiments of the present invention. Head distance tracking circuit 400 may be used in place integer difference conversion circuit 297. Where such is the case, a fractional delay output 483 is connected to one of fractional delay 283, 383, and an integer delay output 493 is connected to one of integer delay output 293, 393.

Head distance tracking circuit 400 is operable to track the fractional distance between heads during steady state (e.g., non-initial phase operation after the initial phase operation where the integer difference is established based upon the locations of sector address marks in data sets derived from the respective heads) and a combination of the fractional distance and the integer distance during initial operation (i.e., during operation where the head distance is changing dramatically). The process of tracking the distance uses multiple gain values designed to accommodate different external processes occurring in relation to a read/write head into which the multiple read heads are integrated. In particular, head distance tracking circuit 400 uses a relatively large loop gain when a seek is being performed to find a desired track on which data is stored. During such a process, the read/write head may be moving from the outer diameter to the inner diameter in which case, as discussed above in relation to FIGS. 1f, 1g, the spacing of data positions relative to the two read heads may change significantly. The larger gain allows head distance tracking circuit 400 to converge more quickly. In contrast, when reading from relatively close regions, the stroke may change such that the skew angle changes slightly (see e.g., FIG. 1c above) resulting in a small change in the down track direction. To address these relatively small changes in down track offset between the heads, head distance tracking circuit 400 uses a relatively small gain allowing for enhanced circuit stability during updating of estimated delay output 418.

Head distance tracking circuit 400 includes an input selection circuit 405 that selects fractional delay output 483 as a distance input 407 when a steady state tracking input 426 indicates an operational mode where little if any change in integer delay output 493 is expected, and selects a sum of fractional delay output 483 and integer delay output 493 (provided as an output of a summation circuit 406) as distance input 407 when a steady state tracking input 426 indicates an operational mode where more substantial changes in integer delay output 493 is expected. Distance input 407 is provided to two calculation circuits. A first calculation circuit 410 calculates a difference between fractional output 407 and a prior value of fractional output 407 to yield an error value 412 in accordance with the following equation:

Error 412=Distance Input 407[*n*]−Distance Input 407[*n*−1], where n indicates the particular instance. A second calculation circuit 415 calculates a difference between distance input 407 and the current value of estimated delay output 418 to yield an error value 417 in accordance with the following equation:

Error 417=Distance Input 407[*n*]−Estimated Delay Output 418.

Error 412 is provided to a moving average calculation circuit 420 where it is averaged with a number of previous instances of error 412 to yield a moving average output 422. Moving average output 422 is provided to a multiplier circuit 425 where it is multiplied by a gain value 479 to yield a product 426. As more fully described below, gain value 479 is selected as a relatively high value when a seek operation is ongoing (i.e., where large incremental changes are indicated), and as a relatively low value when smaller changes are indicated.

Error 417 is provided to a multiplier circuit 470 where it is multiplied by a gain value 477 to yield a product 472. As more fully described below, gain value 477 is selected as a relatively high value when a seek operation is ongoing (i.e., where large incremental changes are indicated), and as a relatively low value when smaller changes are indicated.

Error 417 is also provided to an error gain selection circuit 475. Error gain selection circuit 475 compares error 417 to a programmable threshold 488. Where error 417 is greater than programmable threshold 488, error gain selection circuit 475 selects higher values (i.e., values higher than those selected when error 417 is less than or equal to programmable threshold 488) for gain value 477 and gain value 479. In contrast, where error 417 is less than or equal to programmable threshold 488, error gain selection circuit 475 selects lower values (i.e., values lower than those selected when error 417 is greater than programmable threshold 488) for gain value 477 and gain value 479. Thus, where significant changes are being noted, larger gain values are selected. Where less significant changes are being noted, smaller gain values are selected.

Product 426 is provided to a summation circuit 450 operable to sum it with a slope estimate 457 to yield a slope input 452. Slow input 452 is provided to a slope estimate integration circuit 455 that is operable to integrate a number of instances of slope input 452 to yield slope estimate 457 (i.e., an estimated slope of fractional output 407). Slope estimate integration circuit 455 may be any circuit known in the art that is capable of determining a slope of an input.

Product 472 is provided to a summation circuit 460 operable to sum it with slope estimate 457 and estimated delay output 418 to yield a difference input 462. Difference input 462 is provided to a difference estimate integration circuit 465 that is operable to integrate a number of instances of difference input 462 to yield estimated delay output 418. Difference estimate integration circuit 465 may be any circuit known in the art that is capable of integrating a data input.

It should be noted that in any of the embodiments discussed above in relation to FIGS. 2-4, the ability to perform averaging on some servo fields but not others may be included in the circuitry. For example, a user may wish to average or combine the two signals for Gray code detection but not for repeat run out. Since repeat run out is not a continuous field across the stroke like the sector address mark and GRAY code it may be that on some tracks the averaging will help for repeat run out, but not for others. For example near the outer diameter of a disk platter or an inner diameter of the disk platter where the two heads are likely to have the maximum cross track separation it could be that one of the heads will not come in contact with the repeat run out field and therefore it would only contribute noise to the detection.

During spiral self servo write the concentric position or timing of when to write as well as the radial head position is controlled by reading and processing spiral waveforms in order to correctly position and time the write events in order to write the final concentric servo tracks across the disk surface in the correct locations. There are two fundamental measurements which the channel makes over the spiral waveform which it in turn provides to the controller to facilitate the servo self write process. The first fundamental measurement is the position and phase of the multiple SAM patterns which appear during a spiral event. The second fundamental measurement is the position or location of where the spiral waveform reaches its peak amplitude. In particular, the channel provides burst amplitude information for several burst integration windows which span across the spiral event. An example of spiral measurement is set forth in U.S. Pat. No. 8,498,072 entitled "Systems and methods for spiral waveform detection" and filed on Nov. 29, 2010. The entirety of the aforementioned reference is incorporated herein by reference for all purposes.

When two or more read heads are measuring the spiral signal there is an opportunity to improve the quality of both of these measurements for spiral events. For example since the two read heads will typically be located at slightly different radial positions they will intersect the spiral track at slight different positions and will therefore produce signals which will have largely uncorrelated noise. Therefore the firmware can read the burst measurements from both heads and use this to arrive at a better peak estimate than would be possible with just one read head.

Figure 5A:
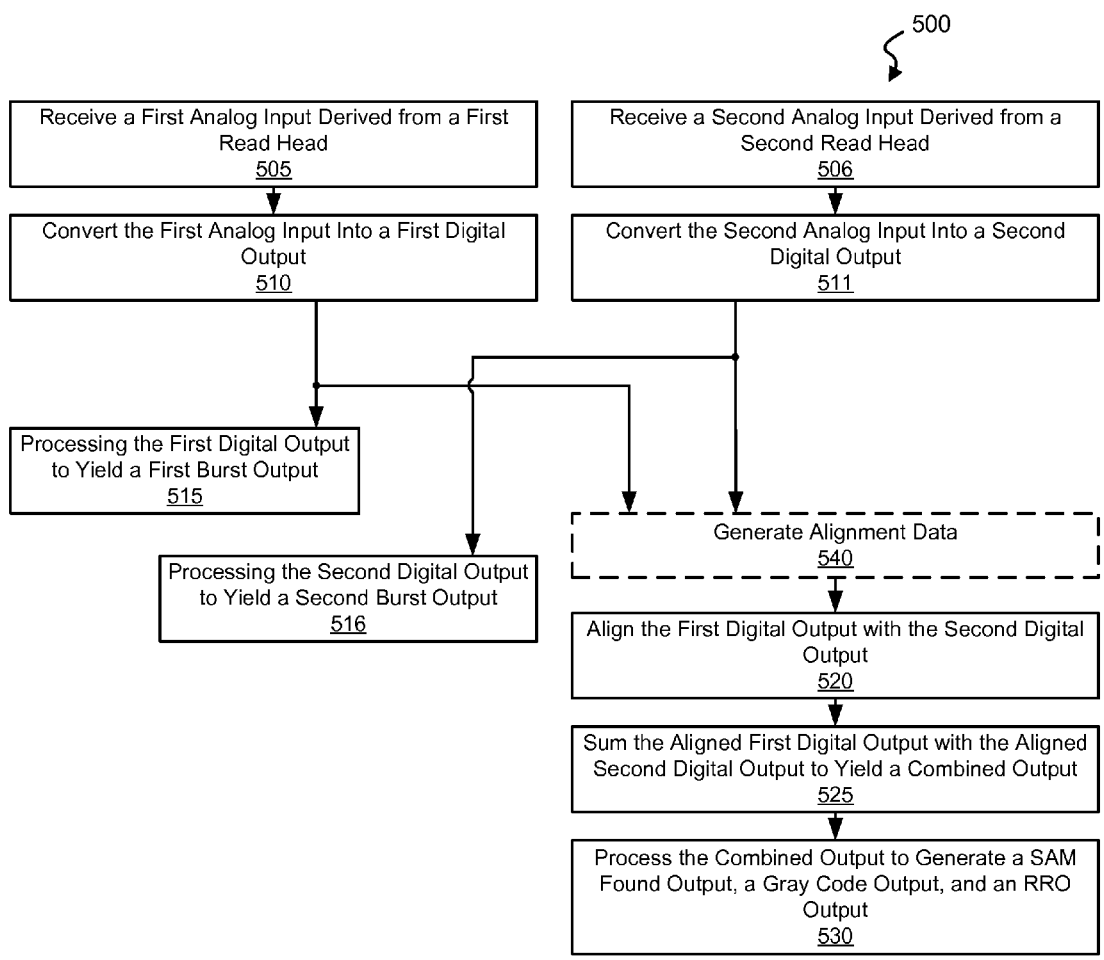
FIGS. 5a-5b are flow diagrams showing a method in accordance with some embodiments of the present invention for determining down-track head separation.
Figure 5B:
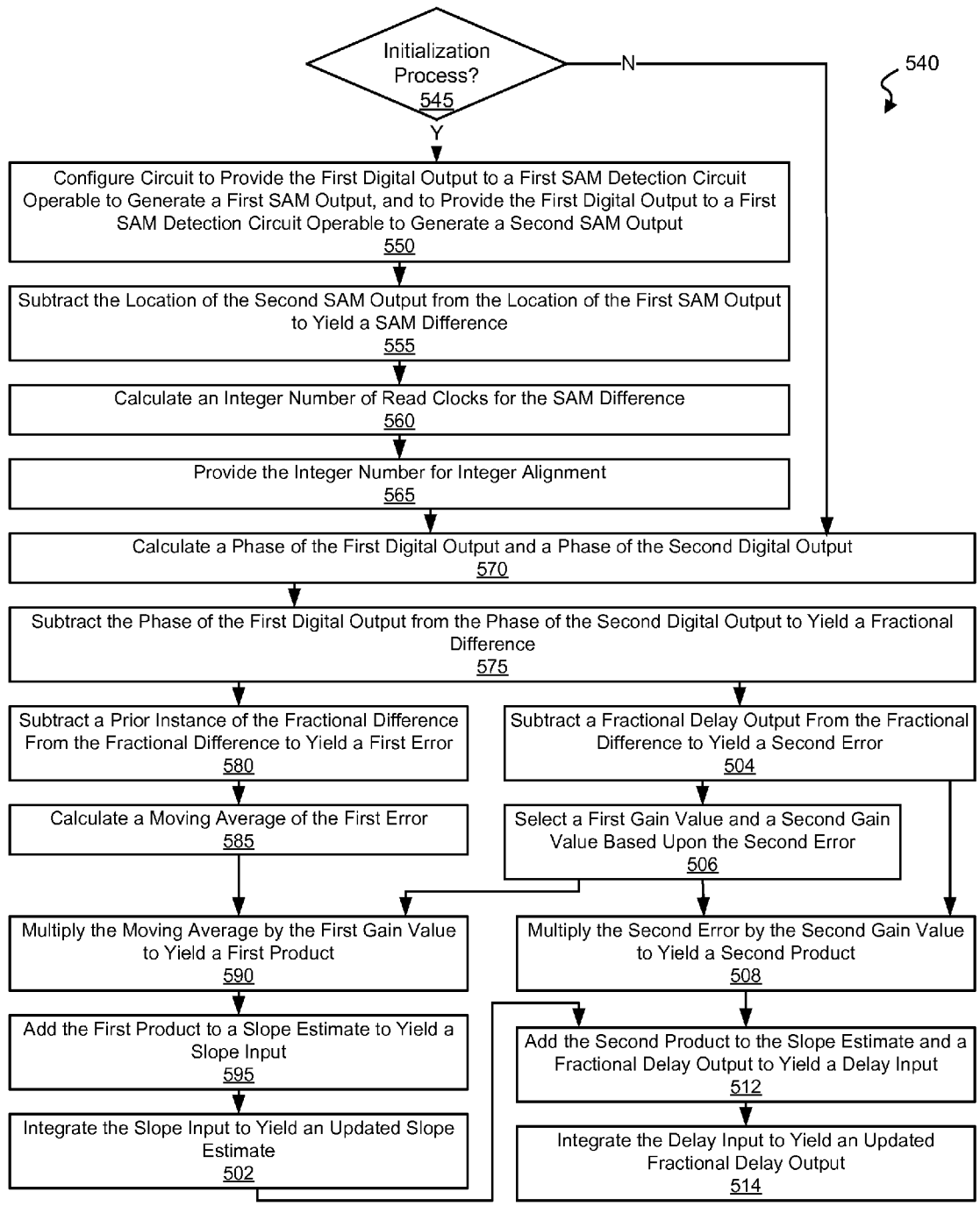

Turning to FIGS. 5a-5b, flow diagrams 500, 540 show a method in accordance with some embodiments of the present invention for determining down-track head separation. Following flow diagram 500 of FIG. 5a, a first analog input is derived from a first read head (block 505). The first read head is disposed in relation to a storage medium that stores servo data. The servo data may be arranged either radially across tracks on the storage medium or spirally across tracks on the storage medium. The first analog input is converted to a first digital sample (block 510). The conversion may be done using a first analog to digital converter circuit. Similarly, a second analog input is derived from a second read head (block 506). The second read head is disposed in relation to the storage medium that stores the servo data. The second analog input is converted to a second digital sample (block 511). The conversion may be done using a second analog to digital converter circuit.

The first digital output is processed to yield a first burst output that indicates an alignment of the first read head relative to the center line of a track on the storage medium (block 515). The processing may include any burst data processing approach known in the art. The second digital output is processed to yield a second burst output that indicates an alignment of the second read head relative to the center line of a track on the storage medium (block 516). Again, the processing may include any burst data processing approach known in the art.

Alignment data is generated based upon the first digital output and the second digital output (block 540). Generation of the alignment data is shown in dashed lines as flow diagram 540 (of the same number of the dashed line block) of FIG. 5b details the process of generating the alignment data. Turning to FIG. 5b and following flow diagram 540, it is determined whether an initialization process is underway (block 545). An initialization process may occur a various times when an active seek or read of a storage medium is not underway. The integer difference between sector address marks is calculated during such an initialization process, and remains constant during standard (i.e., non-initialization) operation. In contrast, a fractional difference is calculated and adjusted during both standard operation and initialization operation.

Where it is determined that an initialization process is underway (block 545), a processing circuit is configured to provide the first digital output to a first SAM detection circuit that operates to detect a sector address mark in the first digital output, and to provide the second digital output to a second SAM detection circuit that operates to detect a sector address mark in the second digital output (block 550). The processing circuit includes two independent SAM detection circuits that may be any circuit known in the art for identifying a sector address mark in a data set. The location of the second SAM output is subtracted from the location of the first SAM output to yield a SAM difference (block 555). The SAM difference is divided by a read clock period to yield an integer number of read clocks in the SAM difference (block 560). The resulting integer number is stored for use in relation to performing integer alignment of the first digital output and the second digital output (block 565).

Either where an initialization operation is underway or not (block 545), a phase of the first digital output and a phase of the second digital output are calculated (block 570). The phase calculation may be done by any circuit known in the art that is capable of calculating a phase based upon a received data input. The phase of the first digital output is subtracted from the phase of the second digital output to yield a fractional difference (block 575).

A fractional delay output is subtracted from the fractional difference to yield a second error (block 504). A first gain value and a second gain value are selected based upon the second error (block 506). The values for both the first gain value and a second gain value are selected as relatively high values when the second error is greater than a threshold value, and are selected as relatively low values when the second error is less than the threshold value.

A prior instance of the fractional difference is subtracted from the fractional difference to yield a first error (block 580), and the resulting first error is incorporated into a moving average to yield a moving average of the first error (block 585). The moving average is multiplied by the first gain value to yield a first product (block 590), and the first product is added to a slope estimate to yield a slope input (block 595). The slope input is then integrated to yield an updated slope estimate (block 502). The second error is multiplied by the second gain value to yield a second product (block 508). The second product is added to the slope estimate and the fractional delay output to yield a delay input (block 512). The fractional delay input is integrated to yield an updated fractional delay output (block 514). This fractional delay output is updated during processing for use in relation to performing fractional alignment of the first digital output and the second digital output.

Returning to FIG. 5a, using the alignment data from block 540, the first digital output is aligned with the second digital output (block 520). This alignment includes both an integer alignment (i.e., aligning to within the same sample period), and fractional alignment (i.e., alignment to within the same fractional portion of the sample period). The aligned data sets are then summed to yield a combined output (block 525). This combined output is then processed to generate a SAM found output, a Gray code output, and an RRO output (block 530). Generation of the SAM found output may be done using any sector address mark detection circuitry or approach known in the art. Generation of the Gray code output may be done using any Gray code processing circuitry or approach known in the art. Generation of the RRO output may be done using any RRO processing circuitry or approach known in the art.

Figure 6:
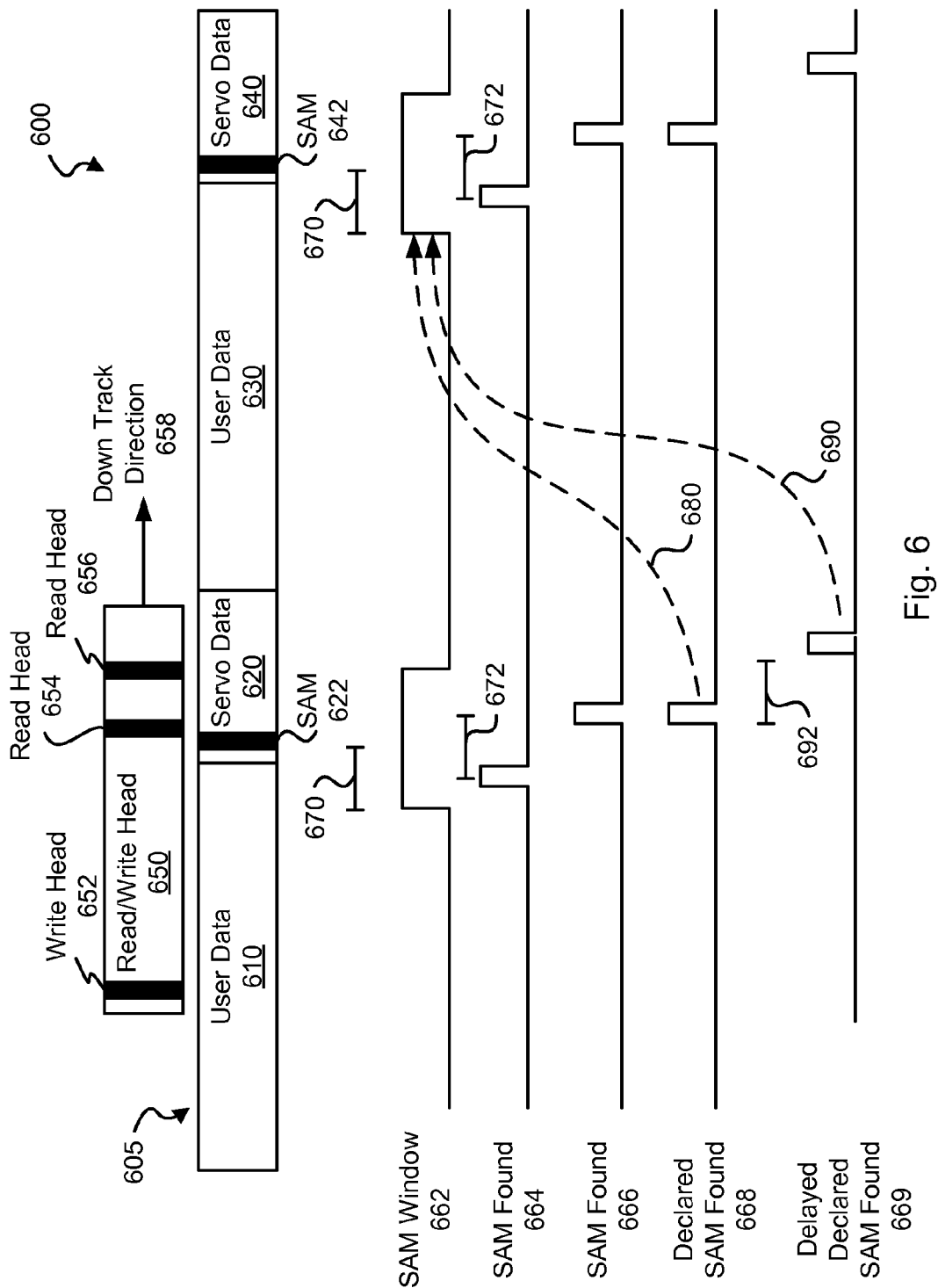
FIG. 6 is a timing diagram showing the relationship of sector address mark found signals and a corresponding sync mark window.

Turning to FIG. 6, a timing diagram 600 shows the relationship of sector address mark found signals and a corresponding sync mark window. As shown in timing diagram 600, a read/write head assembly 650 is shown that includes a write head 652 and two read heads 654, 656. Read/write head assembly 650 moves near the surface of a storage medium 605 in a down track direction 658. Storage medium 605 includes user data regions 610, 630 that are interleaved with servo data regions 620, 640. Servo data regions 620, 640 each include a sector address mark 622, 642, respectively. As read head 656 leads read head 654, it detects sector address marks 622, 642 prior to detection of the same sector address marks by read head 654. This is shown in timing diagram 600 where a SAM found signal 664 (generated by detection of SAM 622 by read head 656) is asserted before a SAM found signal 666 (generated by detection of SAM 622 by read head 654). A distance 672 between assertion of SAM found signal 664 and SAM found signal 666 corresponds to a down track distance between read head 654 and read head 666.

An interface controller circuit asserts a SAM window 662 during which a sector address mark is expected. SAM window 662 is asserted at some distance 670 before the sector address mark is expected, and remains asserted for a period after the sector address mark was expected. Use of such a window avoids indication of a SAM found during, for example, sensing of user data 610, 630 that may randomly include a sector address mark pattern. In a single read head system, assertion of SAM window 662 is relatively straightforward as the distance between successive sector address marks is generally known within a few bit periods. However, in a multi-head system, assertion is substantially more complex. Various embodiments of the present invention adjusts SAM window 662 to accommodate identifying a sector address mark by two or more read heads. In some embodiments of the present invention, the adjustment is done without interaction with a interface controller providing an initial SAM window signal. This may be done by delaying the reporting of a declared SAM found signal 668 by the read channel to the interface controller, and thereby control when the interface controller asserts the next instance of SAM window 662. In one particular embodiment of the present invention, declared SAM found 668 is asserted coincident with assertion of SAM found signal 664 where both SAM found signal 664 and SAM found signal 666 were asserted during an assertion of SAM window 662.

Control of the location of SAM window 662 may be done in one of three ways. First, the head offset information (i.e., distance 672) is provided along with declared SAM found 668 to an interface controller circuit (not shown) that is responsible for opening SAM window 662 at a location where the next SAM is expected (i.e., for switching the read channel circuit from a "data mode" to a "servo mode"). The interface controller circuit is then able to calculate the location of the next SAM window 662 as the location of the declared SAM found 668 plus an expected number of bit periods between sector address marks less a buffer distance corresponding to distance 670 and less the actual down track distance between read head 654 and read head 656 (this calculation being indicated by a dashed line 680). The actual down track distance may be calculated as, for example, integer delay output 313 plus fractional delay output 318 discussed above in relation to FIG. 3. This process is more fully described below in relation to FIG. 7. Such a process may be facilitated by, for example, a new field which is always transferred from the read channel to the interface controller along with the burst results and RRO data.

Second, the interface controller could always assert SAM window 662 at a maximum distance between read head 654 and read head 656 before the expected number of bit periods between sector address marks. Said another way, the interface controller circuit would calculate the next SAM window 662 as the location of the declared SAM found 668 plus an expected number of bit periods between sector address marks less a buffer distance corresponding to distance 670 and less the maximum offset between read head 654 and read head 656 (This calculation being indicated by dashed line 680). This process is more fully described below in relation to FIG. 8. In turn, the read channel circuit receiving SAM window 662 would assert two different instances of a SAM window based upon SAM window 662 including: a first SAM window (not shown) corresponding to an expected location of the SAM as sensed by the first read head, and (2) a second SAM window (not shown) corresponding to an expected location of the SAM as sensed by the second read head. The second SAM window is substantially the first SAM window delayed by an amount corresponding to the down track distance between the first read head and the second read head. The calculation and generation of the first SAM window and the second SAM window based upon SAM window 662 is done by the read channel circuit based upon the calculated down track distance between the first read head and the second read head. As such, the read channel circuit is switched from the "data mode" to the "servo mode" based upon the first SAM window and the second SAM window independently. Said another way, processing of data from the first read head is switched from the "data mode" to the "servo mode" based upon assertion of the first SAM window. At this juncture, processing of data from the second read head may still be processing in the "data mode", and is switched later based upon assertion of the second SAM window.

Third, the interface controller could always assert SAM window 662 at defined number of bit periods from the location of declared SAM found 668, and the read channel can delay the assertion of declared SAM found 668 to yield a delayed, declared SAM found 669. The interface controller asserts SAM window 662 at the location of delayed, declared SAM found 669 plus the defined number of bit periods. Such an approach does not require any change in the operation of the interface controller, only a change in the value programmed as the expected number of expected number of bit periods between sector address marks to be a defined delay period. Control of the location at which SAM window 662 is asserted is achieved by controlling a delay period 692 between when declared SAM found 668 is asserted and when delayed, declared SAM found 669. Delay period 692 is dynamically calculated in the read channel to control when the interface controller will receive an indication of a SAM found (i.e., delayed, declared SAM found 669), and thereby to control when the interface controller asserts SAM window 662. Delay 692 is calculated as the expected number of bit periods between sector address marks less a buffer distance corresponding to distance 670, less the defined number of bit periods imposed by the interface controller, and less the actual down track distance between read head 654 and read head 656 (this calculation being indicated by a dashed line 690). This process is more fully described below in relation to FIG. 9. In such a process, delay will depend not only on the actual down track distance between read head 654 and read head 656, but also on which of read head 654 or read head 656 that has been selected fro SAM detection in the case where one or the other of the heads may be used. For example the best performer of read head 654 and read head 656 may be selected by itself during a power saving mode while the combined head signal stream could be selected for SAM detection during a high performance mode.

In hard disk drives some format is typically lost just before the servo fields due to the fact that the write head lags the read head, therefore in order to turn on the read head when it arrives at the servo field the write head is powered down which means that the amount of media which fits between the write head and the read head goes unused. This format loss is exacerbated where two or more read heads are incorporated into the read/write head assembly as the write is delayed based upon the lagging read head (e.g., read head 654). This additional format loss may be avoided and the space captured for storing user data if the read channel is designed to wait until the lagging head arrived at the servo field before the write is terminated (i.e., until read head 654 moves from user data region 610 to servo data region 620). If a preceding write event is allowed to continue until read head 654 arrives over servo data region 620, and therefore the servo event does not start until that time this would mean that the servo processing associated with read head 656 would need to take this delay into account. The first thing that is done in a servo event is to integrate a programmed amount of preamble in order to measure the signal phase and amplitude. The length of such n integration may be, for example, 32 T. Therefore assuming that the separation between read head 654 and read head 656 is between 5 T and 20 T, the preamble integration length associated with the first head would be reduced from 32 T by the amount of the actual down track distance between read head 654 and read head 656.

However, the integration associated with read head 654 could be used along with the shorter integration of read head 656 to set the phase and amplitude for both signal paths. In particular the current estimate of the phase offset between the two heads could be used to refine the phase estimate of the head1 signal based on the current events measured absolute phase on read head 654. For example, the following equation could be used to determine the phase of read head 656:

$$\text{Phase of Read Head } 656 = \frac{\text{First Phase } 327 * \text{Length Head } 656 + (\text{Second Phase } 328 + \text{Distance } 672) * \text{Length Head } 656}{\text{Length Head } 656 + \text{Length Head } 654},$$

where Length Head 656 is the integration length applied by phase detection circuit 325, and Head 654 is the integration length applied by phase detection circuit 326. A similar operation could be performed to refine the current event amplitude measurement for read head 656. In other words since the two independent gain loops for the two signal paths will drive the average steady state amplitude for both ADC inputs to be the same, then once steady state is reached the amplitude reading for both signals paths should be the same and hence the gain measurement (zgs) performed on read head 654 could potentially also be used to determine the amplitude of the signal from read head 656. In this way the phase and gain estimates for both read head 654 and read head 656 signal paths can still perform better than a single head system even when the phase and gain integration length for read head 656 is less than it would be in a single head system.

Similarly at the end of the servo event, in order to minimize the format loss in the gap when analog front end circuitry of AFE and ADC circuitry 310, 311 is switched from servo processing settings to user data read settings, the current offset between read head 654 and read head 656 can be used to switch AFE and ADC circuitry 310, 311 at different times. In particular, the settings of the analog front end circuitry of AFE and ADC circuitry 310 can be switched from servo to read configuration as soon as read head 656 leaves the servo data 620 and therefore read head 656 can start processing user data 630 even while read head 654 is still reading the servo data region 620. Then, when read head 654 leaves servo data 620 it would be switched based on the measured head offset for this particular track. In this way the unused gap between the servo area and the user data area may be minimized. The known head offset which the read channel measures in the servo clock domain will be translated into a read clock period offset as well. Therefore the timing of head switching as well as user data event processing for both heads may be counted or timed in either clock domain.

Figure 10:
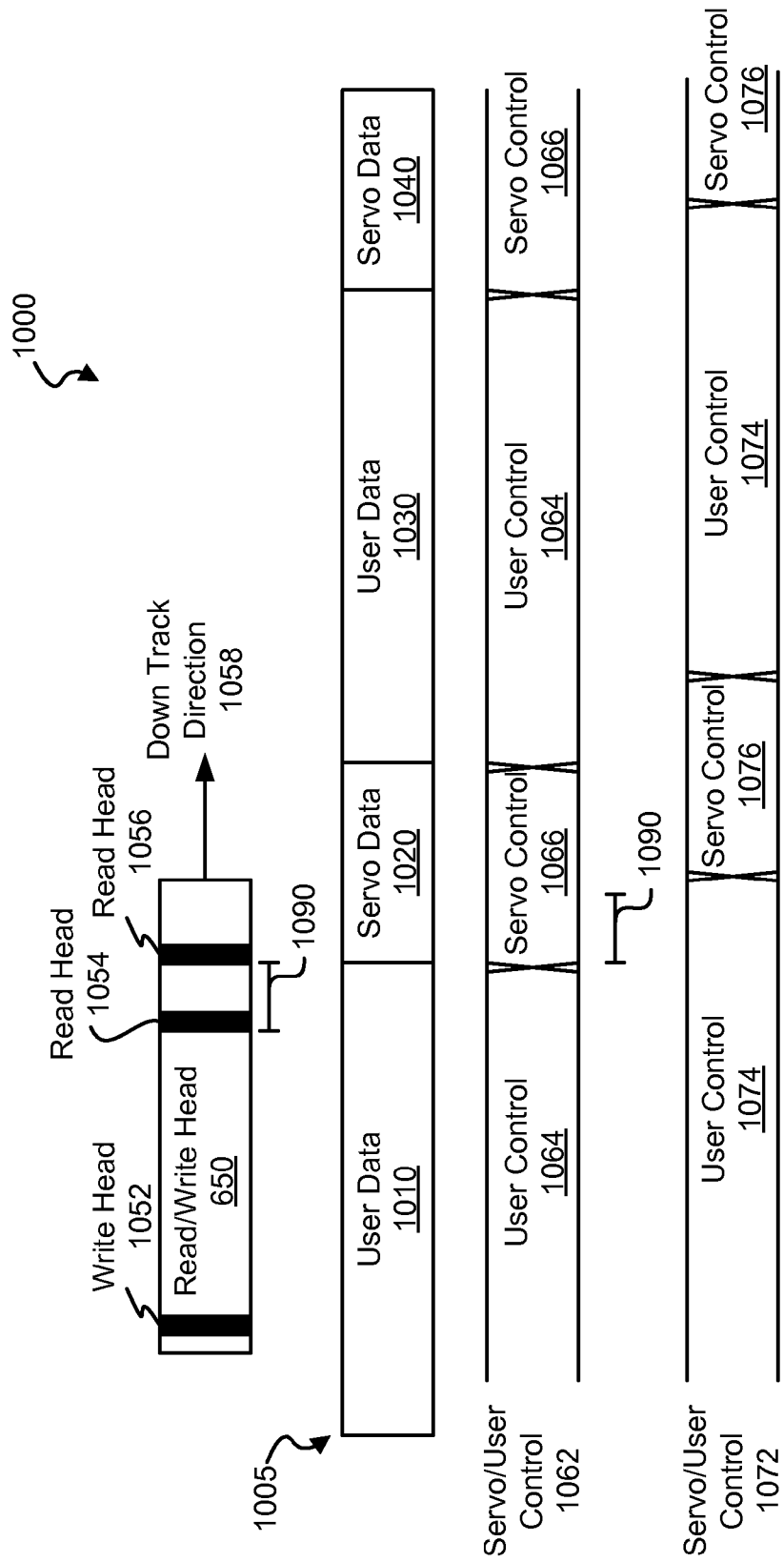
FIG. 10 is a timing diagram 1000 showing the relationship of parameters used by AFE circuitry and servo event indicators in accordance with one or more embodiments of the present invention.

FIG. 10 is a timing diagram 1000 showing independent switching of parameters used by AFE circuitry processing data from a respective read head and/or the indication of a servo event in accordance with one or more embodiments of the present invention. As shown in timing diagram 1000, a read/write head assembly 1050 is shown that includes a write head 1052 and two read heads 1054, 1056. Read/write head assembly 1050 moves near the surface of a storage medium 1005 in a down track direction 1058. Storage medium 1005 includes user data regions 1010, 1030 that are interleaved with servo data regions 1020, 1040. As read head 1056 leads read head 1054, it transitions from user data regions to servo data regions and from servo data regions to user data regions prior to same transition by read head 654. As shown, read head 1056 is separated in down track direction 1058 by a distance 1090.

As a transition from a user data region to a servo data region occurs, the servo processing and user data processing (including associated parameters) are enabled independently for each path as shown by servo/user control 1062 (associated with read head 1056) and servo/user control 1072 (associated with read head 1054). As shown, servo/user control 1062 switches from user control 1064 to servo control 1066 as read head 1056 transitions from user data 1010 to servo data 1020, and from servo control 1066 to user control 1064 as read head 1056 transitions from servo data 1020 to user data 1030. Independent of servo/user control 1062, servo/user control 1072 switches from user control 1074 to servo control 1076 as read head 1054 transitions from user data 1010 to servo data 1020, and from servo control 1076 to user control 1074 as read head 1054 transitions from servo data 1020 to user data 1030.

Figure 7:
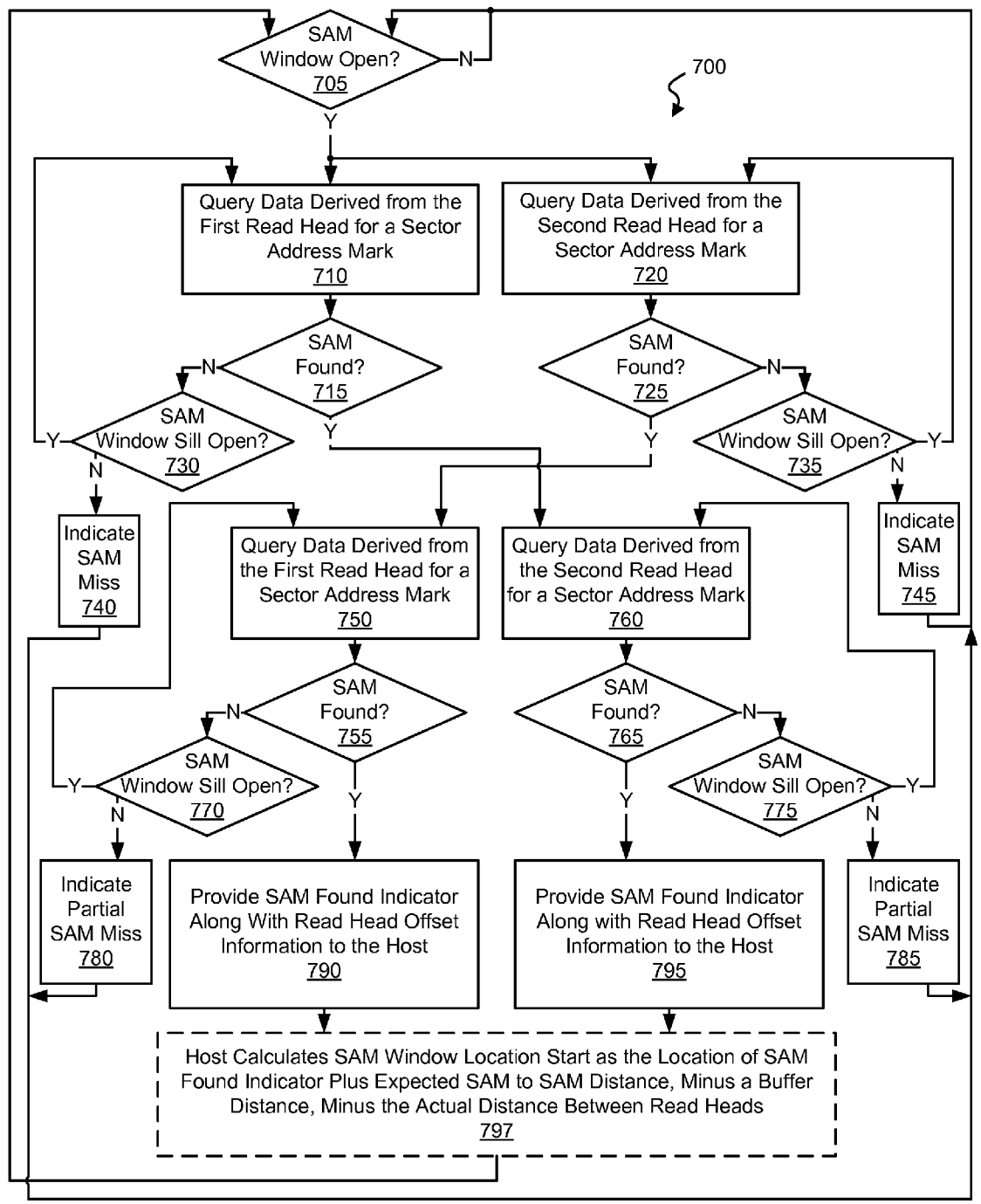
FIG. 7 is a flow diagram showing a method in accordance with some embodiments of the present invention for modified sector address mark window calculation based upon a calculated down track distance between read heads on a read/write head assembly.

Turning to FIG. 7, a flow diagram 700 shows a method in accordance with some embodiments of the present invention for modified sector address mark window calculation based upon a calculated down track distance between read heads on a read/write head assembly. Following flow diagram 700, it is determined whether a SAM window is open (block 705). A SAM window signal is asserted by a interface controller to indicate a region where a sector address mark is likely to be found, and is asserted based upon the location of the last SAM found signal. Where a SAM window is not open (i.e, the SAM window signal is not asserted by the interface controller) (block 705), querying for a sector address mark in received data streams is not performed.

Alternatively, where the SAM window is open (i.e, the SAM window signal is asserted by the interface controller) (block 705), data derived from a first read head is queried for a sector address mark (block 710). This querying continues until either a sector address mark is identified (block 715) or the SAM window is closed (block 730). Where the SAM window closes before a sector address mark is found (block 730), a SAM miss is indicated (block 740), and the process starts again. Alternatively, where a sector address mark is found (block 715), a query of the data derived from a second read head is performed to identify the sector address mark (block 760).

In parallel, where the SAM window is open (i.e, the SAM window signal is asserted by the interface controller) (block 705), data derived from the second read head is queried for a sector address mark (block 720). This querying continues until either a sector address mark is identified (block 725) or the SAM window is closed (block 735). Where the SAM window closes before a sector address mark is found (block 735), a SAM miss is indicated (block 745), and the process starts again. Alternatively, where a sector address mark is found (block 725), a query of the data derived from the first read head is performed to identify the sector address mark (block 750).

It is determined whether a sector address mark is found in the data derived from the first read head after having found the sector address mark in the data derived from the second read head (block 755). This querying continues until either a sector address mark is identified (block 755) or the SAM window is closed (block 770). Where the SAM window closes before a sector address mark is found (block 770), a partial SAM miss is indicated (block 780), and the process starts again. A partial SAM miss indicates that a sector address mark was found in a data stream derived from one of the first or second read heads, but that a sector address mark was not found in the other of the first or second read heads. Alternatively, where a sector address mark is found (block 755), a SAM found indicator is provided along with read head offset information (block 790). The read head offset information includes the calculated down track distance between the first read head and the second read head. The actual down track distance may be calculated as, for example, integer delay output 313 plus fractional delay output 318 discussed above in relation to FIG. 3.

Similarly, it is determined whether a sector address mark is found in the data derived from the second read head after having found the sector address mark in the data derived from the second read head (block 765). This querying continues until either a sector address mark is identified (block 755) or the SAM window is closed (block 775). Where the SAM window closes before a sector address mark is found (block 775), a partial SAM miss is indicated (block 785), and the process starts again. A partial SAM miss indicates that a sector address mark was found in a data stream derived from one of the first or second read heads, but that a sector address mark was not found in the other of the first or second read heads. Alternatively, where a sector address mark is found (block 765), a SAM found indicator is provided along with read head offset information (block 795). The read head offset information includes the calculated down track distance between the first read head and the second read head. The actual down track distance may be calculated as, for example, integer delay output 313 plus fractional delay output 318 discussed above in relation to FIG. 3.

Because one of the read head leads the other, only one of the paths (block 710 to block 795 or block 720 to block 790) will yield a SAM found indicator, and the other path will yield a partial SAM miss (block 780 or block 785). Further, it may be the case that a SAM miss may be generated from one path (i.e., either block 740 or block 745), or from neither path (i.e., neither block 740 or block 745) depending on whether a sector address mark is found within the queried data stream or not.

The interface controller calculates a SAM window location (i.e., the location over which the SAM window will be opened for the subsequent processing)(block 797). The location is calculated as the location of the SAM found indicator plus the expected number of bit periods between sector address marks less a buffer distance corresponding to distance 670 and less the actual down track distance between read head 654 and read head 656 (block 797). This calculated SAM window location is used by the interface controller to assert the SAM window signal that indicates whether or not the SAM window is open. Block 797 is shown in dashed line as it is performed by a interface controller, whereas the other blocks are implemented in the read channel.

Figure 8:
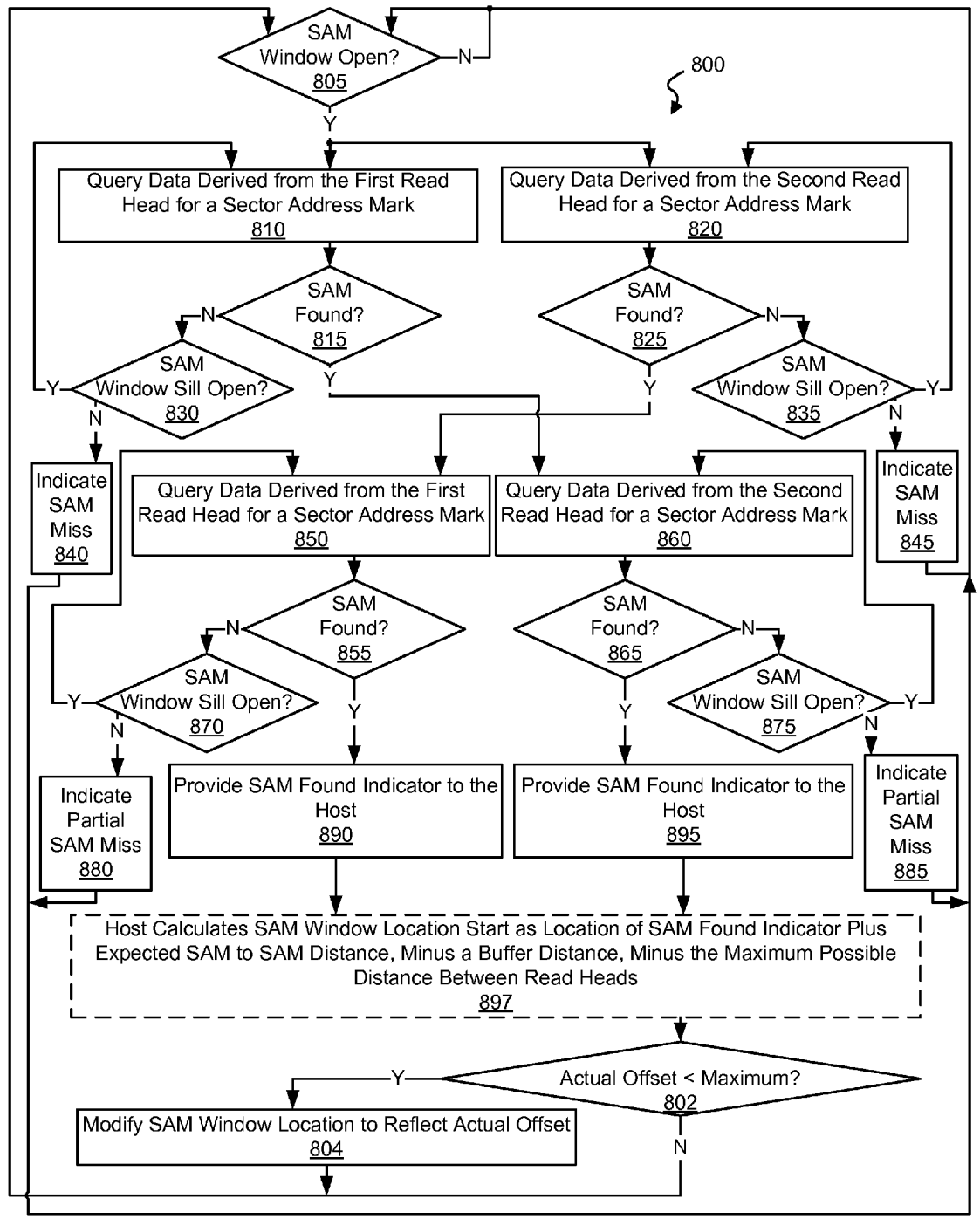
FIG. 8 is a flow diagram showing a method in accordance with various embodiments of the present invention for modified sector address mark window calculation based upon a maximum down track distance between read heads on a read/write head assembly and an actual down track distance between read heads on a read/write head assembly.

Turning to FIG. 8, a flow diagram 800 shows a method in accordance with various embodiments of the present invention for modified sector address mark window calculation based upon a maximum down track distance between read heads on a read/write head assembly and an actual down track distance between read heads on a read/write head assembly. Following flow diagram 800, it is determined whether a SAM window is open (block 805). A SAM window signal is asserted by a interface controller to indicate a region where a sector address mark is likely to be found, and is asserted based upon the location of the last SAM found signal. Where a SAM window is not open (i.e, the SAM window signal is not asserted by the interface controller) (block 805), querying for a sector address mark in received data streams is not performed.

Alternatively, where the SAM window is open (i.e, the SAM window signal is asserted by the interface controller) (block 805), data derived from a first read head is queried for a sector address mark (block 810). This querying continues until either a sector address mark is identified (block 815) or the SAM window is closed (block 830). Where the SAM window closes before a sector address mark is found (block 830), a SAM miss is indicated (block 840), and the process starts again. Alternatively, where a sector address mark is found (block 815), a query of the data derived from a second read head is performed to identify the sector address mark (block 860).

In parallel, where the SAM window is open (i.e, the SAM window signal is asserted by the interface controller) (block 805), data derived from the second read head is queried for a sector address mark (block 820). This querying continues until either a sector address mark is identified (block 825) or the SAM window is closed (block 835). Where the SAM window closes before a sector address mark is found (block 835), a SAM miss is indicated (block 845), and the process starts again. Alternatively, where a sector address mark is found (block 825), a query of the data derived from the first read head is performed to identify the sector address mark (block 850).

It is determined whether a sector address mark is found in the data derived from the first read head after having found the sector address mark in the data derived from the second read head (block 855). This querying continues until either a sector address mark is identified (block 855) or the SAM window is closed (block 870). Where the SAM window closes before a sector address mark is found (block 870), a partial SAM miss is indicated (block 880), and the process starts again. A partial SAM miss indicates that a sector address mark was found in a data stream derived from one of the first or second read heads, but that a sector address mark was not found in the other of the first or second read heads. Alternatively, where a sector address mark is found (block 855), a SAM found indicator is provided to the interface controller (block 890).

Similarly, it is determined whether a sector address mark is found in the data derived from the second read head after having found the sector address mark in the data derived from the second read head (block 865). This querying continues until either a sector address mark is identified (block 855) or the SAM window is closed (block 875). Where the SAM window closes before a sector address mark is found (block 875), a partial SAM miss is indicated (block 885), and the process starts again. A partial SAM miss indicates that a sector address mark was found in a data stream derived from one of the first or second read heads, but that a sector address mark was not found in the other of the first or second read heads. Alternatively, where a sector address mark is found (block 865), a SAM found indicator is to the interface controller (block 895).

Because one of the read head leads the other, only one of the paths (block 810 to block 895 or block 820 to block 890) will yield a SAM found indicator, and the other path will yield a partial SAM miss (block 880 or block 885). Further, it may be the case that a SAM miss may be generated from one path (i.e., either block 840 or block 845), or from neither path (i.e., neither block 840 or block 845) depending on whether a sector address mark is found within the queried data stream or not.

The interface controller calculates a SAM window location (i.e., the location over which the SAM window will be opened for the subsequent processing)(block 897). The location is calculated as the location of the SAM found indicator plus the expected number of bit periods between sector address marks less a buffer distance corresponding to distance 670 and less a maximum possible down track distance between read head 654 and read head 656 (block 897). It is determined by the read channel whether the actual distance between read head 654 and read head 656 is less than the maximum possible distance between read head 654 and read head 656 (block 802). The actual down track distance between read head 654 and read head 656 may be calculated as, for example, integer delay output 313 plus fractional delay output 318 discussed above in relation to FIG. 3. The maximum possible distance between read head 654 and read head 656 is a pre-programmed value representing the greatest possible distance between read head 654 and read head 656 with a skew angle of zero degrees. Where the actual down track distance between read head 654 and read head 656 is less than the maximum possible distance (block 802), the SAM window signal from the interface controller is delayed by an amount corresponding to the difference between the actual down track distance and the maximum possible down track distance (block 804). The interface controller asserts the SAM window signal, and the delayed version of the SAM window signal is used by the read channel to indicate the SAM window location. Block 897 is shown in dashed line as it is performed by a interface controller, whereas the other blocks are implemented in the read channel.

Figure 9:
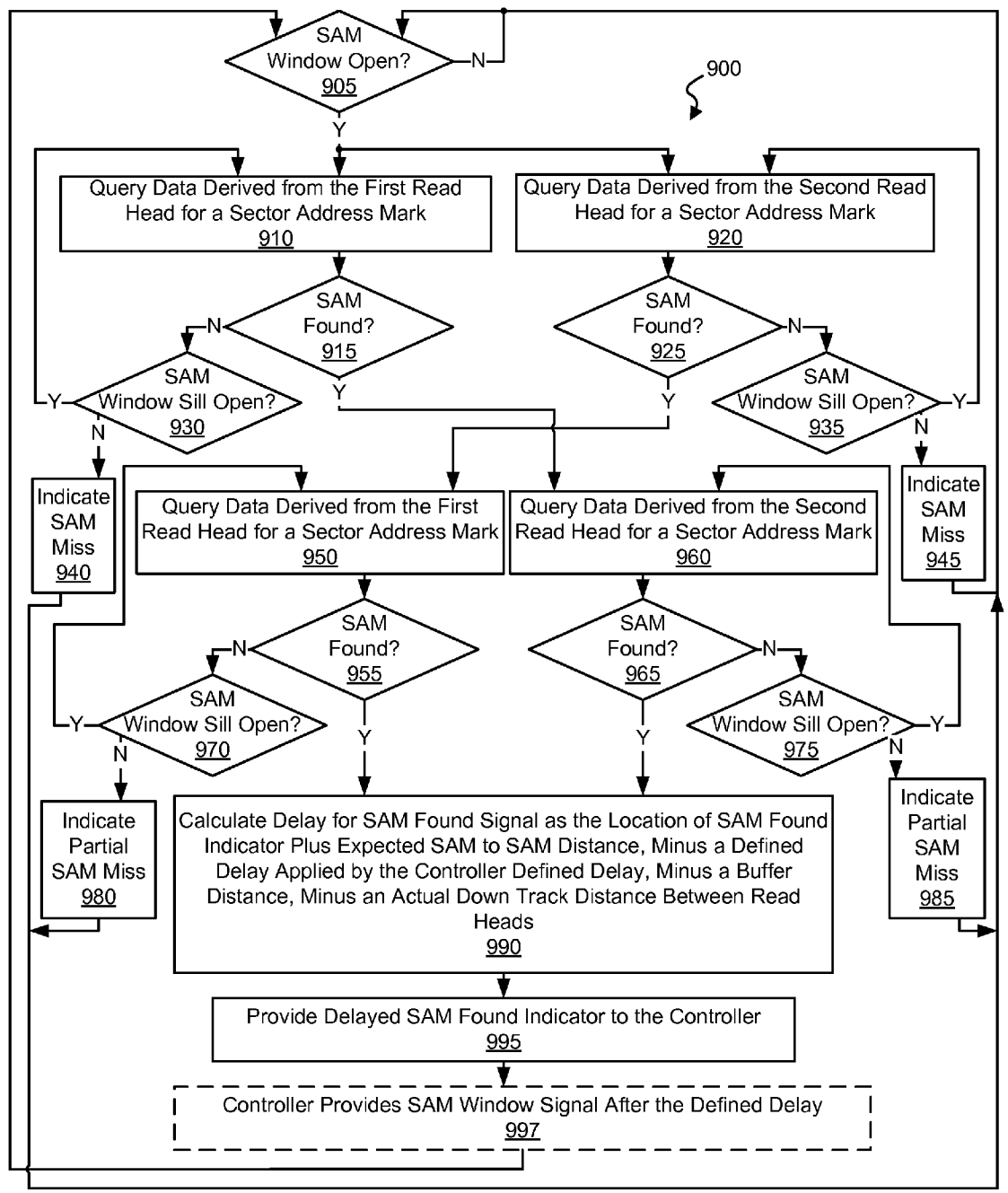
FIG. 9 is a flow diagram showing a method in accordance with other embodiments of the present invention for modified sector address mark window calculation based upon delayed sector address mark reporting.

Turning to FIG. 9, a flow diagram 900 shows a method in accordance with other embodiments of the present invention for modified sector address mark window calculation based upon delayed sector address mark reporting. Following flow diagram 900, it is determined whether a SAM window is open (block 905). A SAM window signal is asserted (i.e., the SAM window is open) by a interface controller to indicate a region where a sector address mark is likely to be found, and is asserted based upon the location of the last SAM found signal. Where a SAM window is not open (i.e, the SAM window signal is not asserted by the interface controller) (block 905), querying for a sector address mark in received data streams is not performed.

Alternatively, where the SAM window is open (i.e, the SAM window signal is asserted by the interface controller) (block 905), data derived from a first read head is queried for a sector address mark (block 910). This querying continues until either a sector address mark is identified (block 915) or the SAM window is closed (block 930). Where the SAM window closes before a sector address mark is found (block 930), a SAM miss is indicated (block 940), and the process starts again. Alternatively, where a sector address mark is found (block 915), a query of the data derived from a second read head is performed to identify the sector address mark (block 960).

In parallel, where the SAM window is open (i.e, the SAM window signal is asserted by the interface controller) (block 905), data derived from the second read head is queried for a sector address mark (block 920). This querying continues until either a sector address mark is identified (block 925) or the SAM window is closed (block 935). Where the SAM window closes before a sector address mark is found (block 935), a SAM miss is indicated (block 945), and the process starts again. Alternatively, where a sector address mark is found (block 925), a query of the data derived from the first read head is performed to identify the sector address mark (block 950).

It is determined whether a sector address mark is found in the data derived from the first read head after having found the sector address mark in the data derived from the second read head (block 955). This querying continues until either a sector address mark is identified (block 955) or the SAM window is closed (block 970). Where the SAM window closes before a sector address mark is found (block 970), a partial SAM miss is indicated (block 980), and the process starts again. A partial SAM miss indicates that a sector address mark was found in a data stream derived from one of the first or second read heads, but that a sector address mark was not found in the other of the first or second read heads. Alternatively, where a sector address mark is found (block 955), a delay for the SAM found signal is calculated as the location of the identified SAM found plus an expected SAM to SAM distance, less a defined delay imposed by the controller, minus a buffered distance 670 and less an actual down track distance between read head 654 and read head 656 (block 990). The indicated SAM found is delayed by the calculated delay amount, and the resulting delayed SAM found indicator is provided to the controller (block 995). The controller then applies the defined delay from the received delayed SAM found indicator, and asserts the SAM window signal (i.e., opening the SAM window) (block 997).

Because one of the read head leads the other, only one of the paths (block 910 to block 995 or block 920 to block 990) will yield a SAM found indicator, and the other path will yield a partial SAM miss (block 980 or block 985). Further, it may be the case that a SAM miss may be generated from one path (i.e., either block 940 or block 945), or from neither path (i.e., neither block 940 or block 945) depending on whether a sector address mark is found within the queried data stream or not.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for synchronizing to a data stream, the system comprising:
    a head assembly including a first read head and a second read head;
    a down track distance calculation circuit operable to calculate a down track distance between the first read head and the second read head; and
    a synchronization mark detection circuit operable to:
        assert a synchronization mark window based at a location based at least in part on the down track distance;
        query a first data set derived from the first read head for a synchronization mark occurring within the synchronization mark window; and
        query a second data set derived from the second read head for the synchronization mark occurring within the synchronization mark window.

2. The system of claim 1, wherein the down track distance calculation circuit comprises:
    an integer distance calculation circuit operable to calculate an integer number of periods of a sample rate within a difference between a location of the synchronization mark in the first data set and a location of the synchronization mark in the second data set.

3. The system of claim 2, wherein the down track distance calculation circuit further comprises:
    a first phase detection circuit operable to determine a phase of the first data set;
    a second phase detection circuit operable to determine a phase of the second data set; and
    a fractional offset calculation circuit operable to calculate a fractional offset of the first read head from the second read head based at least in part on the phase of the first data set.

4. The system of claim 1, wherein the system is implemented as part of a storage device, wherein the storage device includes a storage medium, and wherein the head assembly is disposed in relation to the storage device.

5. The system of claim 4, wherein the down track direction changes based upon a location on the storage medium where the head assembly is disposed.

6. The system of claim 1, wherein the down track distance is calculated by a read channel circuit and provided to a controller circuit, and wherein the controller circuit comprises:
    a synchronization mark window location calculation circuit operable to:
        calculate a location of the synchronization mark window based at least in part on the down track distance; and
        provide a synchronization mark window signal indicating the location of the synchronization mark window to the read channel circuit.

7. The system of claim 1, wherein the down track distance is calculated by a read channel circuit, and wherein the system further includes a controller circuit that comprises:
    a synchronization mark window location calculation circuit operable to:
        calculate a location of the synchronization mark window based at least in part on a maximum possible distance between the first read head and the second read head; and
        provide a synchronization mark window signal indicating the location of the synchronization mark window to the read channel circuit.

8. The system of claim 7, wherein the read channel circuit further comprises:
    a location modification circuit operable to modify the location of the synchronization mark window based upon the down track distance to yield an updated location; and
    wherein the synchronization mark window is asserted based upon the updated location.

9. The system of claim 1, wherein the down track distance is calculated by a read channel circuit, wherein the synchronization mark is identified in at least one of the first data set and the second data set, and wherein the synchronization mark detection circuit is operable to provide a synchronization mark indicator to a controller circuit, wherein the synchronization mark window is asserted before either of the first read head or the second read head is disposed over the location of a next synchronization mark on the storage medium.

10. The system of claim 9, wherein the controller circuit provides a synchronization mark window signal indicating the location of the synchronization mark window to the read channel circuit, and wherein the synchronization mark window signal is asserted based upon the synchronization mark indicator.

11. The system of claim 9, wherein the synchronization mark indicator is the identified synchronization mark delayed by a period calculated based at least in part on the down track direction and to assure that the synchronization mark indicator is asserted at a location based upon a location of the identified synchronization mark.

12. The system of claim 1, wherein the system is implemented as part of an integrated circuit.

13. A method for synchronizing to a data set, the method comprising:
    receiving a first data set derived from a first read head on a head assembly;
    receiving a second data set derived from a second read head on the head assembly;
    calculating a down track distance between the first read head and the second read head using a down track distance calculation circuit operable to calculate a down track distance between the first read head and the second read head;
    asserting a synchronization mark window based at a location based at least in part on the down track distance;
    querying the first data set derived from the first read head for a synchronization mark occurring within the synchronization mark window; and
    query the second data set derived from the second read head for the synchronization mark occurring within the synchronization mark window.

14. The method of claim 13, wherein the down track distance is calculated by a read channel circuit and provided to a controller circuit, and wherein the method further comprises:
- calculating a location of the synchronization mark window based at least in part on the down track distance using a synchronization mark window location calculation circuit included as part of the controller circuit; and
- providing a synchronization mark window signal indicating the location of the synchronization mark window to the read channel circuit.

15. The method of claim 13, wherein the down track distance is calculated by a read channel circuit, and wherein the method further comprises:
- calculating a location of the synchronization mark window based at least in part on a maximum possible distance between the first read head and the second read head using a synchronization mark window location calculation circuit included as part of a controller circuit; and
- providing a synchronization mark window signal indicating the location of the synchronization mark window to the read channel circuit.

16. The method of claim 13, wherein the down track distance is calculated by a read channel circuit, wherein the synchronization mark is identified in at least one of the first data set and the second data set, and wherein a synchronization mark indicator is provided to a controller circuit, and wherein the synchronization mark window is asserted before either of the first read head or the second read head is disposed over the location of a next synchronization mark on the storage medium.

17. The method of claim 16, wherein the controller circuit provides a synchronization mark window signal indicating the location of the synchronization mark window to the read channel circuit, and wherein the synchronization mark window signal is asserted based upon the synchronization mark indicator.

18. The method of claim 16, wherein the synchronization mark indicator is the identified synchronization mark delayed by a period calculated based at least in part on the down track direction and to assure that the synchronization mark indicator is asserted at a location based upon a location of the identified synchronization mark.

19. A system for processing a data stream, the system comprising:
- a head assembly including a first read head and a second read head;
- a down track distance calculation circuit operable to calculate a down track distance between the first read head and the second read head;
- a first data path circuit operable to process data derived from the first read head using first switching parameters;
- a second data path circuit operable to process data derived from the second read head using second switching parameters; and
- wherein the first switching parameters is independent of the second switching parameters, and wherein the timing of the first switching parameters relative to the second switching parameters corresponds to the down track distance.

* * * * *